(12) United States Patent
Huang et al.

(10) Patent No.: US 12,489,689 B2
(45) Date of Patent: Dec. 2, 2025

(54) NETWORK MANAGEMENT METHOD AND RELATED DEVICE

(71) Applicant: HUAWEI TECHNOLOGIES CO., LTD., Shenzhen (CN)

(72) Inventors: Cheng Huang, Shenzhen (CN); Yaoguang Wang, Shanghai (CN); Yijun Yu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/504,963

(22) Filed: Nov. 8, 2023

(65) Prior Publication Data

US 2024/0080249 A1 Mar. 7, 2024

Related U.S. Application Data

(63) Continuation of application No. PCT/CN2021/093744, filed on May 14, 2021.

(51) Int. Cl.
*G06F 13/00* (2006.01)
*H04L 41/50* (2022.01)

(52) U.S. Cl.
CPC .................. *H04L 41/50* (2013.01)

(58) Field of Classification Search
CPC .................. H04L 41/50; H04L 41/00
(Continued)

(56) References Cited

U.S. PATENT DOCUMENTS 8,849,328 B2 * 9/2014 Lin ................ H04W 88/10
455/560
9,526,018 B2 * 12/2016 Gu ................ H04L 41/0672
(Continued)

OTHER PUBLICATIONS

"3rd Generation Partnership Project; Technical Specification Group Services and System Aspects; Management and orchestration; Architecture framework (Release 16)", 3GPP Standard; Technical Specification; 3GPP TS 28.533, 3rd Generation Partnership Project (3GPP), Mobile Competence Centre; 650. Route Des Lucioles; F-06921, Sophia-Antipolis Cedex; France, vol. SA WG5, No. V16.6.0 Dec. 16, 2020 (Dec. 16, 2020), pp. 1-30, XP051999901.
(Continued)

*Primary Examiner* — Kenneth R Coulter
(74) *Attorney, Agent, or Firm* — HAUPTMAN HAM, LLP

(57) ABSTRACT

A network management method and a related device are provided. The method includes: receiving first operation and maintenance service information and/or second operation and maintenance service information; determining a first correspondence between the first operation and maintenance service and the first network management device, and a second correspondence between the second operation and maintenance service and the second network management device; and receiving third operation and maintenance service information, and executing a third operation and maintenance service based on a correspondence between a network device and an operation and maintenance service. At least two network management devices collaborate to provide an operation and maintenance service for a user of an enterprise network. This can prevent a risk of privacy data leakage caused by a reason that all network operation and maintenance services are provided by an operator, and reduce network operation and maintenance costs undertaken by an enterprise.

20 Claims, 9 Drawing Sheets

(58) Field of Classification Search
USPC .......................................... 709/223, 224, 226
See application file for complete search history.

(56) References Cited

U.S. PATENT DOCUMENTS

| | | | |
|---|---|---|---|
| 10,116,545 B2 * | 10/2018 | Yu ........................... | H04L 41/00 |
| 2012/0034942 A1 * | 2/2012 | Lin ....................... | H04L 41/042 |
| | | | 455/507 |
| 2015/0245229 A1 * | 8/2015 | Gu ..................... | H04L 41/0672 |
| | | | 455/560 |
| 2015/0341250 A1 * | 11/2015 | Yu ........................... | H04L 43/10 |
| | | | 370/241.1 |

OTHER PUBLICATIONS

Extended European Search Report issued in corresponding European Application No. 21941362.2, dated Mar. 18, 2024, pp. 1-9.

* cited by examiner

```
┌─────────────────────────────────────────────────────┐
│  A network element management device receives first operation and │
│  maintenance service information and/or second operation and maintenance │
│    service information, where the first operation and maintenance service │      ┌─ 301
│  information is used to describe a first operation and maintenance service │
│   provided by a first network management device, and the second operation │
│   and maintenance service information is used to describe a second operation │
│   and maintenance service provided by a second network management device │
└─────────────────────────────────────────────────────┘
                              │
                              ▼
┌─────────────────────────────────────────────────────┐
│  The network element management device determines a first correspondence │
│    between the first operation and maintenance service and the first network │      ┌─ 302
│    management device, and a second correspondence between the second │
│   operation and maintenance service and the second network management │
│                            device │
└─────────────────────────────────────────────────────┘
                              │
                              ▼
┌─────────────────────────────────────────────────────┐
│       The network element management device receives third operation and │
│   maintenance service information, where the third operation and maintenance │
│     service information is used to describe a third operation and maintenance │
│    service. If the third operation and maintenance service information is from │      ┌─ 303
│        the first network management device, and the third operation and │
│   maintenance service belongs to the first operation and maintenance service, │
│     the network element management device executes the third operation and │
│     maintenance service. Alternatively, if the third operation and maintenance │
│    service information is from the second network management device, and the │
│   third operation and maintenance service belongs to the second operation and │
│    maintenance service, the network element management device executes the │
│                    third operation and maintenance service │
└─────────────────────────────────────────────────────┘
```

FIG. 3

NETWORK MANAGEMENT METHOD AND RELATED DEVICE

CROSS-REFERENCE TO RELATED APPLICATION(S)

This application is a continuation of International Application No. PCT/CN2021/093744, filed on May 14, 2021, the disclosure of which is hereby incorporated by reference in its entirety.

TECHNICAL FIELD

This application relates to the field of network management technologies, and in particular, to a network management method and a related device.

BACKGROUND

Currently, a 5G network (5th generation network) service includes a consumer-oriented service (to consumer) and a business-oriented service (to business, which may also be referred to as a vertical industry service). Compared with the consumer-oriented service, the vertical industry service is provided for users of enterprises. To promote a 5G network to support development of vertical industries, a problem of network operation and maintenance needs to be first resolved for the vertical industries.

Currently, network operation and maintenance for the vertical industries may be undertaken by operators, or may be undertaken by users of enterprises of the vertical industries. If network operation and maintenance are undertaken by the operators, operation and maintenance data related to the users of the enterprises may be disclosed to the operators, which may cause operation and maintenance data leakage. If network operation and maintenance are undertaken by the enterprises, costs of the enterprises increase. How to perform effective network operation and maintenance for vertical industry networks needs to be studied.

SUMMARY

Embodiments of this application provide a network management method and a related device, to provide a safe and effective network operation and maintenance method for a vertical industry network. The method is applied to a communication system, and the communication system includes a first network management device, a second network management device, a network element management device, and a network element. There is a communication connection between the first network management device, the second network management device, and the network element management device. The first network management device and the second network management device collaborate to provide an operation and maintenance service for a network of a user of an enterprise. The network element management device receives an operation and maintenance instruction from the first network management device or the second network management device. The network element management device is configured to perform operation and maintenance management on the network element in a communication system.

According to a first aspect, an embodiment of this application provides a network management method. The method includes: First, a network element management device receives first operation and maintenance service information and/or second operation and maintenance service information. The first operation and maintenance service information is used to describe a first operation and maintenance service provided by a first network management device. The second operation and maintenance service information is used to describe a second operation and maintenance service provided by a second network management device. Then, the network element management device determines a first correspondence between the first operation and maintenance service and the first network management device, and a second correspondence between the second operation and maintenance service and the second network management device. The network element management device receives third operation and maintenance service information, where the third operation and maintenance service information is used to describe a third operation and maintenance service. If the third operation and maintenance service information is from the first network management device, and the third operation and maintenance service belongs to the first operation and maintenance service, the network element management device executes the third operation and maintenance service. Alternatively, if the third operation and maintenance service information is from the second network management device, and the third operation and maintenance service belongs to the second operation and maintenance service, the network element management device executes the third operation and maintenance service. In this embodiment of this application, the first network management device and the second network management device collaborate to provide an operation and maintenance service for a network of a user of an enterprise. Each of the first network management device and the second network management device has a separate network management permission. For example, the first network management device may belong to a network management system of the enterprise, and the second network management device belongs to a network management system of an operator. Alternatively, the first network management device belongs to a network management system of an operator, and the second network management device belongs to a network management system of the enterprise. For example, the first operation and maintenance service is an operation and maintenance service requiring privacy protection. The first operation and maintenance service may be provided by the network management system of the enterprise. The second operation and maintenance service may be provided by the network management system of the operator. The network element management device receives the third operation and maintenance service information. If the third operation and maintenance service information is from the first network management device, and the third operation and maintenance service belongs to the first operation and maintenance service, the network element management device executes the third operation and maintenance service. Alternatively, if the third operation and maintenance service information is from the second network management device, and the third operation and maintenance service belongs to the second operation and maintenance service, the network element management device executes the third operation and maintenance service. This can prevent a risk of privacy data leakage caused by a reason that all network operation and maintenance services are provided by an operator, and reduce network operation and maintenance costs undertaken by the enterprise.

In an optional implementation, the network element management device receives the first operation and maintenance service information and the second operation and maintenance service information. The method includes: receiving the first correspondence and the second correspondence from the first network management device. The first correspondence includes the first operation and maintenance service information. The second correspondence includes the second operation and maintenance service information. In this manner, after the second network management device determines the first correspondence and the second correspondence, the second network management device notifies the network element management device of an operation and maintenance service that each of the first network management device and the second network management device can provide. In this implementation, an interaction process is simple, an interaction process between the first network management device and the network element management device is saved, and signaling overheads of the first network management device are reduced. Alternatively, the network element management device receives the first correspondence and the second correspondence from the second network management device, where the first correspondence includes the first operation and maintenance service information, and the second correspondence includes the second operation and maintenance service information. In this implementation, the first network management device and the second network management device notify the network element management device of the operation and maintenance service that each of the first network management device and the second network management device can provide. In this way, a safety coefficient is relatively high, and the second network management device may not accurately send a network management permission to the network element management device. Alternatively, the network element management device receives the first correspondence from the first network management device, and receives the second correspondence from the second network management device, where the first correspondence includes the first operation and maintenance service information, and the second correspondence includes the second operation and maintenance service information. In this implementation, the network element management device directly receives both the first correspondence and the second correspondence from the first network management device. This can save an interaction process between the second network management device and the network element management device, and reduce signaling overheads of the second network management device.

In an optional implementation, that a network element management device receives first operation and maintenance service information may further specifically include: The network element management device receives the first correspondence from the first network management device or the second network management device, where the first correspondence includes the first operation and maintenance service information. The network element management device may directly receive the first correspondence from the first network management device or the second network management device, and does not need to determine the first correspondence based on the first operation and maintenance service information and/or the second operation and maintenance service information. This saves a resource of the network element management device.

In an optional implementation, that a network element management device receives second operation and maintenance service information may further specifically include: The network element management device receives the second correspondence from the first network management device or the second network management device, where the second correspondence includes the second operation and maintenance service information. The network element management device may directly receive the first correspondence from the first network management device or the second network management device, and does not need to determine the second correspondence based on the first operation and maintenance service information and/or the second operation and maintenance service information. This saves a resource of the network element management device.

In an optional implementation, if the network element management device receives the first operation and maintenance service information and the second operation and maintenance service information from the second network management device, the method further includes: The network element management device receives a third correspondence and a fourth correspondence from the first network management device. The third correspondence is a correspondence between the first operation and maintenance service and the first network management device in the first network management device. The fourth correspondence is a correspondence between the second operation and maintenance service and the second network management device in the first network management device. The network element management device determines a first verification result based on the first correspondence, the second correspondence, the third correspondence, and the fourth correspondence. The first verification result includes a verification success or a verification failure. The verification success indicates that the first correspondence is consistent with the third correspondence, and the second correspondence is consistent with the fourth correspondence. The verification failure indicates that the first correspondence is inconsistent with the third correspondence, or the second correspondence is inconsistent with the fourth correspondence, or the first correspondence is inconsistent with the third correspondence, and the second correspondence is inconsistent with the fourth correspondence. In this embodiment, the first operation and maintenance service information and the second operation and maintenance service information are received by the network element management device from the second network management device. Therefore, the network element management device may perform cross-verification with the first network management device on both the first operation and maintenance service information and the second operation and maintenance service information. This ensures that the first network management device, the first network management device, the second network management device, and the network element management device agree on management permissions for the two network management devices.

In an optional implementation, if the first correspondence is received from the first network management device, and the second correspondence is received from the second network management device, the method further includes: The network element management device sends the second correspondence to the first network management device, and sends the first correspondence to the second network management device. The network element management device receives a second verification result from the first network management device. The second verification result includes a verification success or a verification failure. The verification success of the second verification result indicates that the second correspondence is consistent with a fifth correspondence. The verification failure of the second verification result indicates that the second correspondence is inconsistent with the fifth correspondence. The fifth correspondence is a correspondence between the second operation and maintenance service and the second network management device in the first network management device. The network element management device receives a third verification result from the second network management device. The third verification result includes a verification success or a verification failure. The verification success of the third verification result indicates that the first correspondence is consistent with a sixth correspondence. The verification failure of the third verification result indicates that the first correspondence is inconsistent with the sixth correspondence. The sixth correspondence is a correspondence between the first operation and maintenance service and the first network management device in the second network management device. In this embodiment, the two network element management devices notify the network element management device of the operation and maintenance services provided by the two network element management devices respectively. Then, the network element management device separately performs cross-validation with the first network management device and the second network management device on the correspondence between the first network management device and the first operation and maintenance service, and the correspondence between the second network management device and the second operation and maintenance service. In this case, management permissions for the two network management devices are determined between the three devices, namely, the first network management device, the second network management device, and the network management device.

In an optional implementation, the method further includes: The network element management device receives identifier information. The identifier information is used to identify one or more of the following: the first network management device, a user of an enterprise corresponding to the first network management device, or an operator corresponding to the first network management device. The network element management device determines a first association relationship between the identifier information and the first correspondence, and a second association relationship between the identifier information and the second correspondence. In this embodiment, when the second network management device provides the network operation and maintenance service for a plurality of enterprises, the second network management device generates the identifier information to distinguish between different users of the enterprises. The identifier information may be used to identify the first network management device. Alternatively, the identifier information may be used to identify a user of an enterprise corresponding to the first network management device. If the user of the enterprise is in a one-to-one correspondence with the network management device, that is, the first network management device is private to the user of the enterprise, the identifier information generated by the second network management device may be used to identify the first network management device. If the first network management device corresponding to the user of the enterprise may change, for example, the first network management device is leased by the user of the enterprise, the identifier information generated by the second network management device is used to identify the user of the enterprise. When a communication system includes network management devices deployed by at least two operators, the identifier information may be further used to identify an operator corresponding to the network management device.

In an optional implementation, the first network management device belongs to a network management system of a first enterprise, and the second network management device belongs to the network management system of an operator, or a network management system of a second enterprise. In this embodiment, if the first network management device belongs to the network management system of the first enterprise, and the second network management device belongs to the network management system of the operator, a risk of privacy data leakage caused by a reason that all network operation and maintenance services are provided by an operator can be prevented, and network operation and maintenance costs undertaken by the enterprise can be reduced. If the first network management device belongs to the network management system of the first enterprise, and the second network management device belongs to the network management system of the second enterprise, the enterprises may also collaborate to provide a network operation and maintenance service. Network operation and maintenance costs may be shared by the first enterprise and the second enterprise, reducing the network operation and maintenance costs of the two enterprises.

In an optional implementation, each of the first operation and maintenance service information and the second operation and maintenance service information is a type of the operation and maintenance service, including one or more of the following: configuration management CM, fault management FM, or performance management PM. Alternatively, each of the first operation and maintenance service information and the second operation and maintenance service information is an operation of the operation and maintenance service.

In an optional implementation, the method further includes: The network element management device obtains time information. The time information indicates effective time and/or expiration time of the first operation and maintenance service information. Alternatively, the time information indicates effective time and/or expiration time of the first operation and maintenance service information. In this embodiment, the network element management device may receive time information from the first network management device or the second network management device. The time information is used by the network element management device to determine the effective time period in which the first network management device can provide the first operation and maintenance service, and the effective time period in which the second network management device can provide the second operation and maintenance service.

According to a second aspect, this application provides a network management method, applied to a first network management device. The first network management device may belong to a network management system deployed by an enterprise. Alternatively, the first network management device may belong to a network management system deployed by an operator. The method further includes: The first network management device determines first operation and maintenance service information. The first operation and maintenance service information is used to describe a first operation and maintenance service for which the first network management device is responsible. The first network management device sends the first operation and maintenance service information. The first operation and maintenance service information is used to determine a first correspondence between the first operation and maintenance service and the first network management device. In this embodiment, the first network management device may determine the first operation and maintenance service undertaken by the first network management device. Then, the first network management device sends the first operation and maintenance service information undertaken by the first network management device. The network element management device may determine the first correspondence between the first operation and maintenance service and the first network management device based on the first operation and maintenance service information, and further determine a second correspondence between a second network management device and a second operation and maintenance service. In this case, the first network management device and the second network management device collaborate to provide a network management, operation, and maintenance service for a user of an enterprise.

In an optional implementation, the method further includes: The first network management device sends the second correspondence. The second correspondence is a correspondence between the second operation and maintenance service and the second network management device in the first network management device. In this embodiment, the first network management device may directly send the second correspondence to the network element management device and the second network management device, so that both the network element management device and the second network management device determine that the second network management device can provide the second operation and maintenance service.

In an optional implementation, that the first network management device sends the first operation and maintenance service information may further specifically include:

The first network management device may directly send the first correspondence to the network element management device or the second network management device. The first correspondence includes the first operation and maintenance service information. Therefore, the network element management device or the second network management device does not need to determine the first correspondence based on the first operation and maintenance service information. This saves a computing resource of the network management device and the second network management device.

In an optional implementation, the method further includes: The first network management device receives a seventh correspondence of the second network management device from the network element management device. The seventh correspondence is a correspondence, in the second network management device, between the second operation and maintenance service and the second network management device. The first network management device determines a fourth verification result based on the seventh correspondence and the second correspondence. The second correspondence is a correspondence between the second operation and maintenance service and the second network management device in the first network management device. The first network management device sends the fourth verification result to the network element management device. The fourth verification result includes a verification success or a verification failure. The verification success of the fourth verification result indicates that the seventh correspondence is consistent with the second correspondence. The verification failure of the fourth verification result indicates that the seventh correspondence is inconsistent with the second correspondence. In this embodiment, the network element management device receives the seventh correspondence from the second network management device. The network element management device needs to verify the seventh correspondence with the first network management device, to ensure that the "correspondence between the second operation and maintenance service and the second network management device" in the first network management device, the network element management device, and the second network management device is consistent. This further ensures that the first network management device and the second network management device perform effective collaborative operation and maintenance management on a network.

In an optional implementation, that the first network management device determines first operation and maintenance service information includes: The first network management device receives the first operation and maintenance service information from the second network management device, or the first network management device generates the first operation and maintenance service information. When the first network management device belongs to the network management system deployed by the enterprise, the first network management device determines the first operation and maintenance service that can be undertaken by the first network management device, that is, the first network management device generates the first operation and maintenance service information. When the first network management device belongs to the network management system deployed by the operator, and the second network management device belongs to the network management system deployed by the enterprise, after the second network management device determines the first operation and maintenance service information, the first network management device may receive the first operation and maintenance service information from the second network management device.

In an optional implementation, the method further includes: The first network management device obtains time information. The time information indicates effective time and/or expiration time of the first operation and maintenance service information. The time information may be used by the first network management device to determine the effective time period for providing the first operation and maintenance service. For example, when the first network management device belongs to the network management system deployed by the operator, the operator may determine a time period in which the first operation and maintenance service is leased by the enterprise.

In an optional implementation, the method further includes: The first network management device obtains identifier information. The identifier information is used to identify one or more of the following: the first network management device, a user of an enterprise corresponding to the first network management device, or an operator corresponding to the first network management device. The first network management device determines a first association relationship between the identifier information and the first correspondence. When the first network management device belongs to the network management system deployed by the operator, the first network management device generates the identifier information. When the first network management device belongs to the network management system deployed by the enterprise, the first network management device receives the identifier information from the second network management device.

In an optional implementation, the first network management device belongs to the network management system of the enterprise, and the second network management device belongs to the network management system of an operator. Alternatively, the first network management device belongs to the network management system of an operator, and the second network management device belongs to the network management system of the enterprise. Alternatively, the first network management device belongs to a network management system of a first enterprise, and the second network management device belongs to a network management system of a second enterprise. In this embodiment, network management devices of at least two parties collaborate to provide a network operation and maintenance service for an enterprise network. That the at least two parties collaborate to provide the network operation and maintenance service may be that both the enterprise and the operator collaborate to provide the network operation and maintenance service for the enterprise. Alternatively, that the at least two parties collaborate to provide the network operation and maintenance service may be that enterprises collaborate to perform the network operation and maintenance service, to provide a safe and effective network operation and maintenance service for a user of an enterprise.

In an optional implementation, the first operation and maintenance service information is a type of the operation and maintenance service, including one or more of the following: configuration management CM, fault management FM, or performance management PM. Alternatively, the first operation and maintenance service information is an operation of the operation and maintenance service.

According to a third aspect, an embodiment of this application provides a communication apparatus, including:
 a transceiver module, configured to receive first operation and maintenance service information and/or second operation and maintenance service information, where the first operation and maintenance service information is used to describe a first operation and maintenance service provided by a first network management device, and the second operation and maintenance service information is used to describe a second operation and maintenance service provided by a second network management device; and
 a processing module, configured to determine a first correspondence between the first operation and maintenance service and the first network management device, and a second correspondence between the second operation and maintenance service and the second network management device.

The transceiver module is further configured to receive third operation and maintenance service information, where the third operation and maintenance service information is used to describe a third operation and maintenance service.

If the third operation and maintenance service information is from the first network management device, and the third operation and maintenance service belongs to the first operation and maintenance service, the processing module is further configured to execute the third operation and maintenance service; or
 if the third operation and maintenance service information is from the second network management device, and the third operation and maintenance service belongs to the second operation and maintenance service, the processing module is further configured to execute the third operation and maintenance service.

Specifically, in an optional implementation, the transceiver module is further configured to receive the first correspondence and the second correspondence from the first network management device. The first correspondence includes the first operation and maintenance service information, and the second correspondence includes the second operation and maintenance service information. Alternatively, the transceiver module is further configured to receive the first correspondence and the second correspondence from the second network management device. The first correspondence includes the first operation and maintenance service information, and the second correspondence includes the second operation and maintenance service information. Alternatively, the transceiver module is further configured to: receive the first correspondence from the first network management device and receive the second correspondence from the second network management device. The first correspondence includes the first operation and maintenance service information, and the second correspondence includes the second operation and maintenance service information.

In an optional implementation, if receiving the first operation and maintenance service information and the second operation and maintenance service information from the second network management device, the transceiver module is further configured to receive a third correspondence and a fourth correspondence from the first network management device. The third correspondence is a correspondence between the first operation and maintenance service and the first network management device in the first network management device. The fourth correspondence is a correspondence between the second operation and maintenance service and the second network management device in the first network management device.

The processing module is further configured to determine a first verification result based on the first correspondence, the second correspondence, the third correspondence, and the fourth correspondence. The first verification result includes a verification success or a verification failure. The verification success indicates that the first correspondence is consistent with the third correspondence, and the second correspondence is consistent with the fourth correspondence. The verification failure indicates that the first correspondence is inconsistent with the third correspondence, or the second correspondence is inconsistent with the fourth correspondence, or the first correspondence is inconsistent with the third correspondence, and the second correspondence is inconsistent with the fourth correspondence.

In an optional implementation, if the first correspondence is received from the first network management device, and the second correspondence is received from the second network management device, the transceiver module is further configured to: send the second correspondence to the first network management device; send the first correspondence to the second network management device; receive a second verification result from the first network management device, where the second verification result includes a verification success or a verification failure, the verification success of the second verification result indicates that the second correspondence is consistent with a fifth correspondence, and the verification failure of the second verification result indicates that the second correspondence is inconsistent with the fifth correspondence, and the fifth correspondence is a correspondence between the second operation and maintenance service and the second network management device in the first network management device; and receive a third verification result from the second network management device. The third verification result includes a verification success or a verification failure. The verification success of the third verification result indicates that the first correspondence is consistent with a sixth correspondence. The verification failure of the third verification result indicates that the first correspondence is inconsistent with the sixth correspondence. The sixth correspondence is a correspondence between the first operation and maintenance service and the first network management device in the second network management device.

In an optional implementation, the transceiver module is further configured to receive identifier information. The identifier information is used to identify one or more of the following: the first network management device, a user of an enterprise corresponding to the first network management device, or an operator corresponding to the first network management device.

The processing module is further configured to determine a first association relationship between the identifier information and the first correspondence, and a second association relationship between the identifier information and the second correspondence.

In an optional implementation, the transceiver module is further configured to obtain time information, where the time information indicates effective time and/or expiration time of the first operation and maintenance service information.

In an optional implementation, each of the first operation and maintenance service information and the second operation and maintenance service information is a type of the operation and maintenance service, including one or more of the following: configuration management CM, fault management FM, or performance management PM. Alternatively, each of the first operation and maintenance service information and the second operation and maintenance service information is an operation of the operation and maintenance service.

According to a fourth aspect, an embodiment of this application provides a communication apparatus, used in a first network management device. The communication apparatus includes:

a processing module, configured to determine first operation and maintenance service information, where the first operation and maintenance service information is used to describe a first operation and maintenance service for which the first network management device is responsible; and a transceiver module, configured to send the first operation and maintenance service information, where the first operation and maintenance service information is used to determine a first correspondence between the first operation and maintenance service and the first network management device.

In an optional implementation, the transceiver module is further configured to send a second correspondence. The second correspondence is a correspondence between a second operation and maintenance service and a second network management device in the first network management device.

In an optional implementation, the transceiver module is further configured to send the first correspondence to a network element management device or the second network management device. The first correspondence includes the first operation and maintenance service information.

In an optional implementation, the transceiver module is further configured to receive a seventh correspondence of a second network management device from the network element management device. The seventh correspondence is a correspondence, in the second network management device, between a second operation and maintenance service and the second network management device.

The processing module is further configured to determine a fourth verification result based on the seventh correspondence and the second correspondence. The second correspondence is a correspondence between the second operation and maintenance service and the second network management device in the first network management device.

The transceiver module is further configured to send the fourth verification result to the network element management device. The fourth verification result includes a verification success or a verification failure. The verification success of the fourth verification result indicates that the seventh correspondence is consistent with the second correspondence. The verification failure of the fourth verification result indicates that the seventh correspondence is inconsistent with the second correspondence.

In an optional implementation, the processing module is further configured to receive the first operation and maintenance service information from the second network management device. Alternatively, the first network management device generates the first operation and maintenance service information.

In an optional implementation, the transceiver module is further configured to obtain time information, where the time information indicates effective time and/or expiration time of the first operation and maintenance service information.

In an optional implementation, the transceiver module is further configured to obtain identifier information. The identifier information is used to identify one or more of the following: the first network management device, a user of an enterprise corresponding to the first network management device, or an operator corresponding to the first network management device.

The processing module is further configured to determine a first association relationship between the identifier information and the first correspondence.

In an optional implementation, the first network management device belongs to the network management system of the enterprise, and the second network management device belongs to the network management system of an operator. Alternatively, the first network management device belongs to the network management system of an operator, and the second network management device belongs to the network management system of the enterprise. Alternatively, the first network management device belongs to a network management system of a first enterprise, and the second network management device belongs to a network management system of a second enterprise.

In an optional implementation, the first operation and maintenance service information is a type of the operation and maintenance service, including one or more of the following: configuration management CM, fault management FM, or performance management PM. Alternatively, the first operation and maintenance service information is an operation of the operation and maintenance service.

According to a fifth aspect, an embodiment of this application provides a communication device, including a processor. The processor is coupled to at least one memory, and the processor is configured to read a computer program stored in the at least one memory, so that the communication device performs the method according to any implementation of the first aspect, or the communication device performs the method according to any implementation of the second aspect.

According to a sixth aspect, an embodiment of this application provides a non-transitory computer-readable storage medium, configured to store a computer program or instructions. When the computer program or the instructions are executed, a computer is enabled to perform the method according to any implementation of the first aspect, and when the computer program or the instructions are executed, a computer is enabled to perform the method according to any implementation of the second aspect.

According to a seventh aspect, an embodiment of this application provides a chip. The chip includes a processor and a communication interface. The communication interface is, for example, an input/output interface, a pin, or a circuit. The processor is configured to read instructions to perform any method according to the first aspect. Alternatively, the processor is configured to read instructions to perform the method according to any implementation in the second aspect.

According to an eighth aspect, an embodiment of this application provides a computer program product. The computer program product includes computer program code. When the computer program code is executed by a computer, the computer is enabled to perform the method according to any implementation in the first aspect; or when the computer program code is executed by a computer, the computer is enabled to perform the method according to any implementation in the second aspect.

BRIEF DESCRIPTION OF DRAWINGS

FIG. 3 is a schematic flowchart of a network management method according to an embodiment of this application;

DESCRIPTION OF EMBODIMENTS

The following describes technical solutions in embodiments of this application with reference to accompanying drawings in embodiments of this application.

It should be further noted that "at least one" means one or more, and "a plurality of" means two or more. "And/or" describes an association relationship between associated objects, and indicates that three relationships may exist. For example, A and/or B may represent the following cases: Only A exists, both A and B exist, and only B exists. A and B each may be singular or plural. The character "/" generally indicates an "or" relationship between the associated objects. "At least one of the following items (pieces)" or a similar expression thereof means any combination of these items, including a singular item (piece) or any combination of plural items (pieces). For example, at least one item (piece) of a, b, or c may indicate: a, b, c, a and b, a and c, b and c, or a, b, and c. a, b, and c may be singular or plural. The singular expression forms "one", "a", "the", "the foregoing", "this", and "the one" are also intended to include an expression form such as "one or more", unless the opposite is explicitly indicated in the context thereof. In this specification, claims, and accompanying drawings of this application, the terms "first", "second", and the like are intended to distinguish between similar objects but do not necessarily indicate a specific order or sequence.

Figure 1:
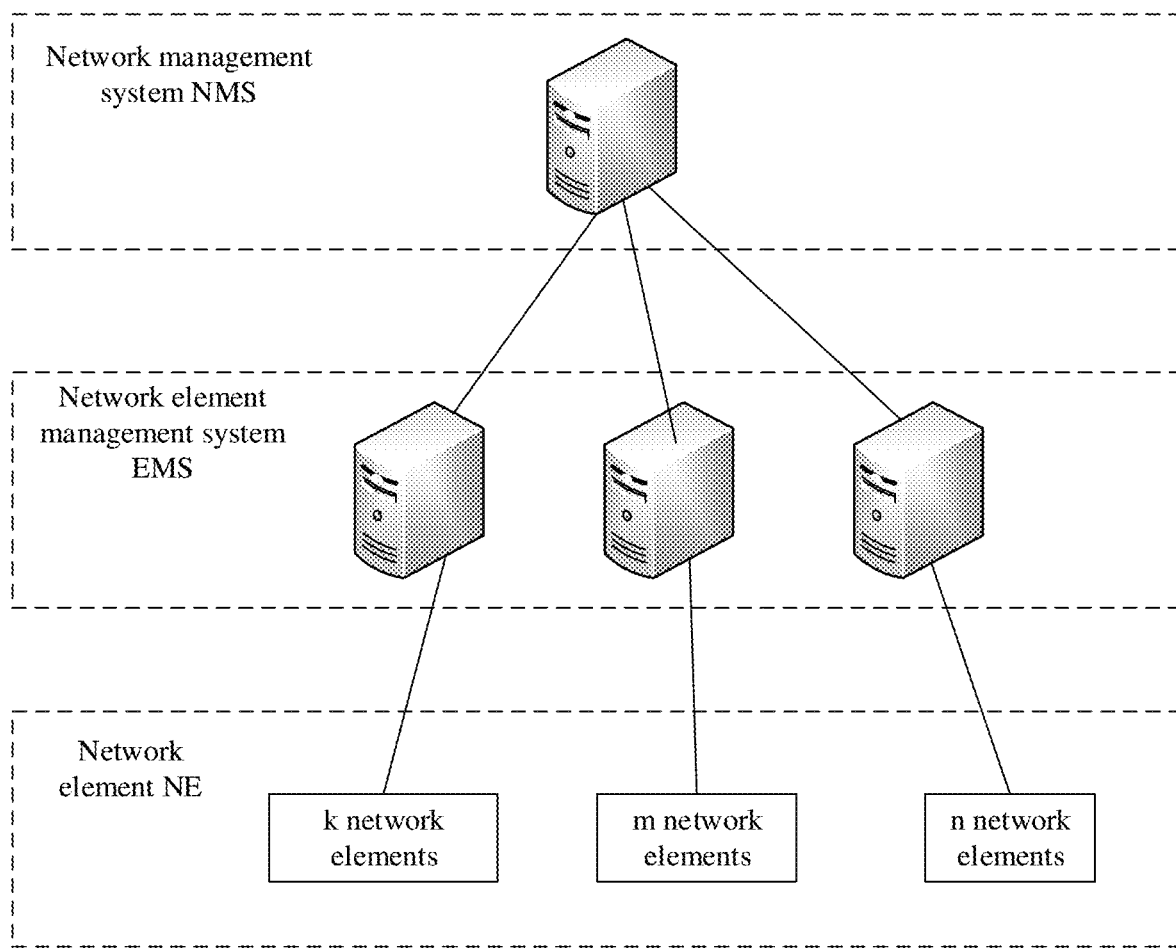
FIG. 1 is a schematic diagram of a system architecture for network operation and maintenance management in a vertical industry.

Refer to FIG. 1. A three-layer structure is usually used to perform operation and maintenance management on a mobile communication network. A first layer is a network management system (network management system, NMS) layer, a second layer is a network element management system (network element management system, EMS) layer, and a third layer is a network element (network element, NE) layer. The EMS is a bridge between the NMS layer and the NE layer. The EMS is used to manage communication between network elements. The NE includes a hardware device and software running on the hardware device. For example, the network element layer may include an access network element or a core network element. As shown in FIG. 1, the NMS may manage one or more EMSs, and each EMS may also manage one or more NEs. For example, as shown in FIG. 1, from left to right, a first EMS manages k network elements, a second EMS manages m network elements, and the first EMS manages n network elements, where k, m, and n are all positive integers. A process of operation and maintenance management performed by the three-layer structure on the network includes: The EMS receives an operation and maintenance instruction from the NMS, executes the operation and maintenance instruction, and performs operation and maintenance management (also referred to as network operation and maintenance management) on the network element in the network. Operation and maintenance management performed by the EMS on the network element includes at least one of configuration management (configuration management, CM), fault management (fault management, FM), or performance management (performance management, PM).

Figure 2:
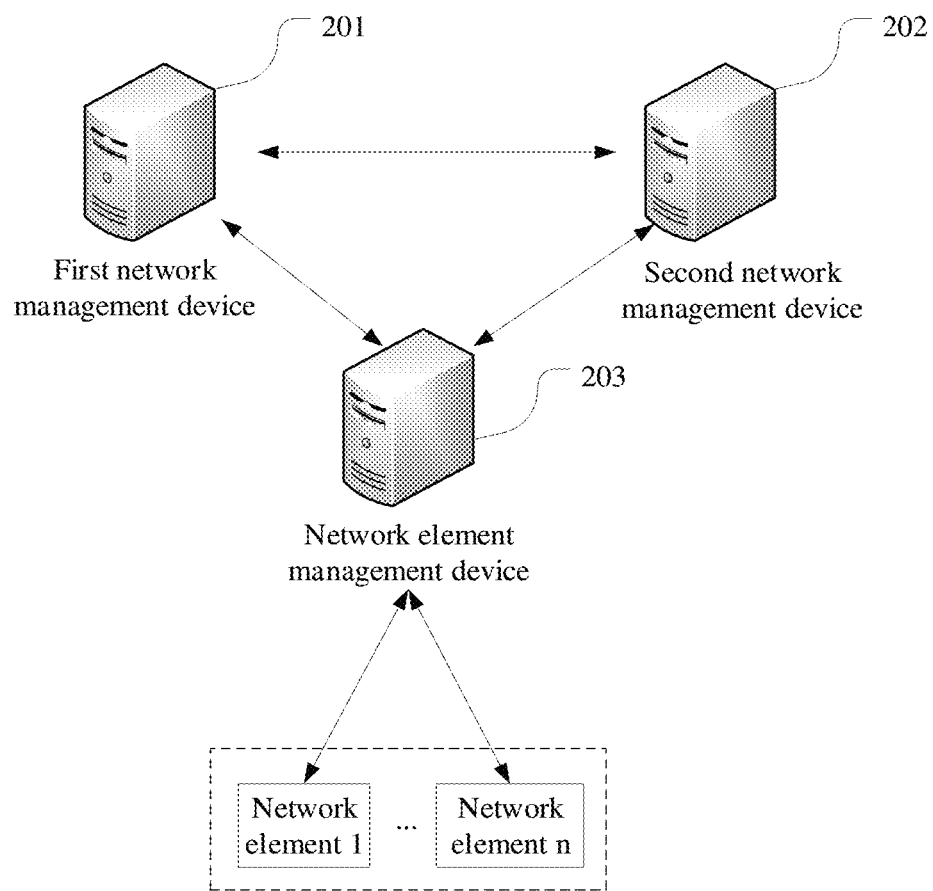
FIG. 2 is a schematic diagram of an architecture of a communication system according to an embodiment of this application.

FIG. 2 shows a communication system according to this application. The communication system includes a first network management device 201, a second network management device 202, and a network element management device 203. For example, the first network management device 201 and the second network management device 202 belong to the NMS layer shown in FIG. 1, and the network element management device 203 belongs to the EMS layer shown in FIG. 1. There is a communication connection between the first network management device 201, the second network management device 202, and the network element management device 203. It may be understood that each of the first network management device 201, the second network management device 202, and the network element management device 203 may be a network element in a hardware device, or a software function running on dedicated hardware, or a virtualized function instantiated on a platform (for example, a cloud platform), or a server. The network element management device 203 is configured to manage one or more types of network elements (for example, a network element 1, . . . , a network element n).

In the communication system provided in this application, the first network management device and the second network management device collaborate to provide an operation and maintenance service for a user network. Each of the first network management device and the second network management device has a separate network management permission. For example, the first network management device may belong to a network management system of the enterprise, and the second network management device belongs to a network management system of an operator. Alternatively, the first network management device belongs to a network management system of an operator, and the second network management device belongs to a network management system of the enterprise. For example, some operation and maintenance services (such as a PM service) that require privacy protection are provided by the network management system of the enterprise, and another operation and maintenance service may be provided by the network management system of the operator. This can prevent a risk of privacy data leakage caused by a reason that all network operation and maintenance services are provided by the operator, and reduce network operation and maintenance costs undertaken by the enterprise. For another example, the first network management device may belong to a network management system of a first enterprise, and the second network management device may belong to a network management system of a second enterprise. To reduce network operation and maintenance costs, enterprises can also collaborate to provide a network operation and maintenance service. For example, the network management system of the first enterprise performs operation and maintenance on an operation and maintenance service of the first enterprise that requires privacy protection, and another operation and maintenance service may be provided by the network management system of the second enterprise. In this network operation and maintenance mode between the enterprises, for the first enterprise, privacy data leakage can be prevented, and network operation and maintenance costs can be reduced. The second enterprise can provide the operation and maintenance service for a network of the second enterprise, and provide the network operation and maintenance service for another enterprise. Network operation and maintenance costs may be shared by the first enterprise. This reduces network operation and maintenance costs of the second enterprise. In this embodiment of this application, the enterprise and the operator may perform multi-party collaboration on network operation and maintenance, or a plurality of enterprises may perform multi-party collaboration on network operation and maintenance. This is not specifically limited.

For better understanding of this application, terms used in this application are described first.

(1) Network Operation and Maintenance Service

The network operation and maintenance service is classified into configuration management (CM), performance management (PM), and fault management (FM). For example, configuration management (CM) provides a service of monitoring configuration information of a network and a network element device. Performance management (PM) is used to provide a service of collecting and analyzing network element performance data. For example, PM is used to collect quality data about actual running of a device related to the network. The quality data is used to collect statistics on or rectify a status and performance of the network or a network element. Fault management (FM) is used to provide a service of collecting real-time statistics on an abnormal running state of a network management device and a network channel, and providing an alarm. In this way, a user can isolate and rectify a fault in short time, to recover a service affected by the fault.

Specifically, each operation and maintenance service type may include a plurality of types of operations of the operation and maintenance service. For example, an NMS invokes an operation and maintenance service provided by an EMS, which may be understood as follows: After the NMS notifies the EMS to perform an operation of the operation and maintenance service, the EMS performs the operation of the operation and maintenance service on a specific network element.

For example, CM includes the following several operations of the operation and maintenance service: create a managed object instance (create managed object instance), obtain managed object instance attributes (get managed object instance attributes), modify managed object instance attributes (modify managed object instance attributes), and delete a managed object instance (delete managed object instance).

FM includes the following operation of the operation and maintenance service: obtain alarm information (get alarm).

PM includes the following operations of the operation and maintenance service: create a measurement job (create measurement job), and delete a measurement job (delete measurement job).

(2) Profile Information

The profile information is used to describe network management permission information. The network management permission information includes: a first operation and maintenance service provided by a first network management device. Optionally, the network management permission information further includes: a second operation and maintenance service provided by a second network management device. For example, description information corresponding to the first operation and maintenance service is an operation and maintenance service undertaken by an NMS deployed by a user of an enterprise. Description information corresponding to the second operation and maintenance service is an operation and maintenance service that the user of the enterprise expects to lease an NMS of an operator to provide. Optionally, the profile information further includes one or more of the following: a user identifier (for example, a user of an enterprise name), a vertical industry type, time information, user location information, internet protocol (Internet Protocol, IP) information, or the like. An IP of the first network management device is used for both communication between the first network management device and a network element management device, and communication between the first network management device and the second network management device. In addition, both the second network management device and the network element management device may be deployed by the operator. Therefore, the second network management device is provided with an IP address of the network element management device, and the network element management device is provided with an IP address of the second network management device. The profile information may not include the IP addresses of the second network management device and the network element management device.

The vertical industry type indicates an industry to which the user of the enterprise belongs. For example, the vertical industry type includes a steel industry, an internet industry, a medical industry, or the like.

The time information indicates effective time of the network management permission information. For example, the time information may be any one of the following three cases:

1. The time information indicates effective time. For example, the effective time may be a start date on which the network management permission takes effect. For example, the effective time is Feb. 1, 2021, and may be a time cycle by default. Specific duration of the default time cycle is not limited, and may be set based on an actual situation. For example, if the time cycle is one year, the effective time period of the network management permission indicated by the time information is from Feb. 1, 2021 to Feb. 1, 2022. Alternatively, the effective time is one time period. For example, the effective time is from Feb. 1, 2021 to Feb. 1, 2022.

2. The time information indicates expiration time. The expiration time may be a date when the network management permission expires. For example, the expiration time may be Feb. 1, 2023. If a default time cycle is two years, an effective time period of the network management permission indicated by the time information is from Feb. 1, 2021 to Feb. 1, 2023. Alternatively, the expiration time may be one time period. For example, the expiration time is from Feb. 1, 2021 to Feb. 1, 2023.

3. The time information indicates effective time and expiration time. The effective time is an effective date of the network management permission information, and the expiration time is an expiration date of the network management permission information. For example, the time information is from Feb. 1, 2021 to Feb. 1, 2023.

Regardless of a specific form that is used, the time information may be used by the second network management device, the first network management device, and the network element management device to determine effective time in which the second network management device can provide the second operation and maintenance service, and effective time in which the first network management device can provide the first operation and maintenance service.

For example, content included in the profile information is shown in the following Table 1.

TABLE 1

| Attribute name | Description information |
| --- | --- |
| User identifier | For example, "AAA" |
| Vertical industry type | For example, a steel industry |
| Time information | Effective time of each of a first operation and maintenance service and a second operation and maintenance service |
| User location information | For example, No. XX, XX Street, XX District, XX City, XX Province |
| IP information | IP address of a first network management device |
| First operation and maintenance service | Describing an operation and maintenance service (such as PM) provided by the first network management device |
| Second operation and maintenance service | Describing an operation and maintenance service (such as CM and FM) provided by the second network management device |

The profile information shown in Table 1 is only an example for description, and does not constitute a limitation on the content in the profile information. It should be understood that the profile information may further include more information based on an actual requirement. The first network management device receives the profile information shown in Table 1. For example, the first network management device may obtain the profile information in the following manner: A profile template is preconfigured in the first network management device, and the profile template includes an attribute name. The first network management device receives description information entered by operation and maintenance management personnel of the user of the enterprise. The first network management device generates the profile information based on the profile template and the description information entered by the operation and maintenance management personnel.

The following describes embodiments of this application with reference to the accompanying drawings. Refer to FIG. 3. An embodiment of this application provides a network management method. A network element management device in FIG. 3 is the network element management device 203 in FIG. 2, a first network management device in FIG. 3 is the first network management device 201 in FIG. 2, and a second network management device in FIG. 3 is the second network management device 202 in FIG. 2.

Step 301: The network element management device receives first operation and maintenance service information and/or second operation and maintenance service information, where the first operation and maintenance service information is used to describe a first operation and maintenance service provided by a first network management device, and the second operation and maintenance service information is used to describe a second operation and maintenance service provided by a second network management device.

First, the first operation and maintenance service information and the second operation and maintenance service information are used as an example for description.

The first operation and maintenance service information and the second operation and maintenance service information describe a type of the operation and maintenance service. For example, the first operation and maintenance service information is used to describe PM, and the second operation and maintenance service information is used to describe CM and FM. Alternatively, the first operation and maintenance service information and the second operation and maintenance service information describe an operation of the operation and maintenance service. For example, the first operation and maintenance service information describes an operation of creating a managed object instance, an operation of obtaining managed object instance attributes, an operation of modifying managed object instance attributes, and an operation of deleting a managed object instance. The second operation and maintenance service describes an operation of obtaining alarm information, an operation of creating a performance measurement job (create measurement job), an operation of deleting a performance measurement job (delete measurement job), and the like.

A relationship between the first operation and maintenance service information and the second operation and maintenance service information may be one or more of the following plurality of cases:

Case 1: Both the first operation and maintenance service described in the first operation and maintenance service information and the second operation and maintenance service described in the second operation and maintenance service information cover all operation and maintenance services. In other words, a union set of both the first operation and maintenance service information and the second operation and maintenance service information can describe all the operation and maintenance services. For example, all the operation and maintenance services include PM, CM, and FM. The first operation and maintenance service described in the first operation and maintenance service information includes PM. The second operation and maintenance service described in the second operation and maintenance service information includes CM and FM.

Case 2: A union set of both the first operation and maintenance service described in the first operation and maintenance service information and the second operation and maintenance service described in the second operation and maintenance service information is less than all operation and maintenance services. For example, the first operation and maintenance service is PM, and the second operation and maintenance service is CM.

Case 3: The first operation and maintenance service described in the first operation and maintenance service information and the second operation and maintenance service described in the second operation and maintenance service information have an intersection. In other words, the first operation and maintenance service and the second operation and maintenance service may include a same specific service. For example, the first operation and maintenance service includes PM and CM, and the second operation and maintenance service includes CM and FM. When the first operation and maintenance service and the second operation and maintenance service have the intersection, the following two scenarios may occur:

(1) No instruction conflict occurs. For example, both the first operation and maintenance service and the second operation and maintenance service include the "operation of obtaining managed object instance attributes", because the operation of the operation and maintenance service is only for obtaining an attribute, and there is no conflict problem.

(2) An instruction conflict occurs. In this case, optionally, the network element management device determines, based on priority information, an instruction of which network management device is to be executed. For example, the priority information is a network management device identifier. The network element management device preferentially executes an operation and maintenance service invocation request from a network management device identified by the network management device identifier. The priority may be obtained in either of the following two manners: (1) Priority information corresponding to an operation of the operation and maintenance service is preconfigured in the network element management device. The priority information indicates that the first network management device or the second network management device has a higher priority for the operation of the operation and maintenance service. (2) When receiving the first operation and maintenance service information or the second operation and maintenance service information, the network element management device receives the priority information from the first network management device or the second network management device. For example, the intersection of the first operation and maintenance service and the second operation and maintenance service is the "operation of creating a managed object instance" or "operation of modifying managed object instance attributes". Because creation or modification is involved, an instruction conflict may occur when the first network management device and the second network management device invoke a same operation of the operation and maintenance service from the network element management device. The first network management device sends the priority information to the network element management device when invoking the operation of the operation and maintenance service. When the instruction conflict occurs, the network element management device preferentially executes an operation instruction of the operation and maintenance service sent by the first network element management device.

Then, the network element management device may receive the first operation and maintenance service information and/or the second operation and maintenance service information in any one of the following manners:

Manner 1: The network element management device receives the first operation and maintenance service information from the first network management device, or the network element management device receives the second operation and maintenance service information from the second network management device. In the manner 1, the relationship between the first operation and maintenance service information and the second operation and maintenance service information meets the foregoing case 1. To be specific, the first network management device, the second network management device, and the network element management device all learn that the union set of the first operation and maintenance service information and the second operation and maintenance service information can describe all the operation and maintenance services. The network element management device can determine the second operation and maintenance service information based on the first operation and maintenance service information, or the network element management device can determine the first operation and maintenance service information based on the second operation and maintenance service information. For example, a universal set of operation and maintenance services includes CM, PM, and FM. The network element management device receives the first operation and maintenance service information from the first network management device. The first operation and maintenance service information is used to describe PM. The network element management device can determine the second operation and maintenance service information based on the first operation and maintenance service information. The second operation and maintenance service information is used to describe CM and FM. Alternatively, the network element management device receives the second operation and maintenance service information from the second network management device. The second operation and maintenance service information is used to describe CM and FM. The network element management device can determine the first operation and maintenance service information based on the second operation and maintenance service information. The first operation and maintenance service information is used to describe PM.

Manner 2: The network element management device receives the first operation and maintenance service information and the second operation and maintenance service information. For example, the network element management device receives the first operation and maintenance service information and the second operation and maintenance service information from the first network management device. Alternatively, the network element management device receives the first operation and maintenance service information and the second operation and maintenance service information from the second network management device. In the manner 2, the relationship between the first operation and maintenance service information and the second operation and maintenance service information meets any one of the foregoing case 1, case 2, and case 3.

Manner 3: The network element management device receives a first correspondence and/or a second correspondence. The first correspondence includes the first operation and maintenance service information. The first correspondence is a correspondence between the first operation and maintenance service and the first network management device. The second correspondence includes the second operation and maintenance service information. The second correspondence is a correspondence between the second operation and maintenance service and the second network management device. When the relationship between the first operation and maintenance service information and the second operation and maintenance service information meets the foregoing case 1, the network element management device receives the first correspondence from the first network management device (or the second network management device), and the network element management device can determine the second correspondence based on the first correspondence. Alternatively, the network element management device receives the second correspondence from the first network management device (or the second network management device), and can determine the first correspondence based on the second correspondence. Alternatively, the network element management device receives the first correspondence and the second correspondence from the first network management device (or the second network management device). Alternatively, the network element management device receives the first correspondence from the first network management device, and receives the second correspondence from the second network management device.

For example, in the manner 3, the first correspondence received by the network element management device is shown in Table 2-1. In Table 2-1, the first correspondence includes an identifier A of the first network management device and the first operation and maintenance service information.

TABLE 2-1

| First correspondence | |
| --- | --- |
| Identifier A | First operation and maintenance service information |

The second correspondence received by the network element management device is shown in Table 2-2 below. In Table 2-2, the second correspondence includes an identifier B of the second network management device and the second operation and maintenance service information.

TABLE 2-2

| Second correspondence | |
| --- | --- |
| Identifier B | Second operation and maintenance service information |

It may be understood that the following differences exist between the manner 1 and the manner 3. For example, in the foregoing manner 1, after receiving the first operation and maintenance service information from the first network device, the network element management device establishes a correspondence between the first operation and maintenance service information and the first network management device. In other words, the network element management device learns that the first operation and maintenance service information is from the first network management device, and therefore determines the first correspondence. In the manner 3, the network element management device directly receives the first correspondence from the first network management device.

It may be understood that both the first operation and maintenance service information and the first correspondence describe a network management permission of the first network management device, and both the second operation and maintenance service information and the second correspondence describe a network management permission of the second network management device. For example, both the first operation and maintenance service information and the first correspondence describe an operation and maintenance service undertaken by an enterprise. Both the second operation and maintenance service information and the second correspondence describe an operation and maintenance service undertaken by an operator.

Step 302: The network element management device determines the first correspondence between the first operation and maintenance service and the first network management device, and the second correspondence between the second operation and maintenance service and the second network management device.

For example, in the foregoing manner 1, if the network element management device receives the first operation and maintenance service information from the first network management device, the network element management device can determine, based on the first operation and maintenance service information, the first operation and maintenance service provided by the first network management device, and determine that an operation and maintenance service (the second operation and maintenance service) other than the first operation and maintenance service is undertaken by the second network management device. Similarly, if the network element management device receives the second operation and maintenance service information from the second network management device, the network element management device can determine, based on the second operation and maintenance service information, the second operation and maintenance service provided by the second network management device, and determine that an operation and maintenance service (the first operation and maintenance service) other than the second operation and maintenance service is undertaken by the first network management device. Therefore, the network element management device may determine the first correspondence between the first network management device and the first operation and maintenance service, and the second correspondence between the second network management device and the second operation and maintenance service.

For example, in the foregoing manner 2, when the network element management device receives the first operation and maintenance service information and the second operation and maintenance service information, optionally, the network element management device further receives one indication identifier. The indication identifier may indicate a correspondence between the first operation and maintenance service information and an information sender, or indicate a correspondence between the second operation and maintenance service information and an information sender. For example, the network element management device receives the first operation and maintenance service information, the second operation and maintenance service information, and an indication identifier from the first network management device. The indication identifier indicates that the first operation and maintenance service information (an information sender) has a correspondence with the first network management device. In this case, the network element management device can determine, based on the indication identifier, the first correspondence between the first operation and maintenance service described in the first operation and maintenance service information and the first network management device, and can further determine the second correspondence between the second operation and maintenance service described in the second operation and maintenance service information and the second network management device.

For example, in the foregoing manner 3, the network element management device receives the first correspondence and the second correspondence, and the network element management device determines the first correspondence and the second correspondence. In this embodiment of this application, the network element management device receives the first operation and maintenance service information and/or the second operation and maintenance service information. The network element management device further determines, based on the first operation and maintenance service information and/or the second operation and maintenance service information, an operation and maintenance service provided by each network management device, that is, determines the first correspondence and the second correspondence. The following uses an example in which the network element management device determines the first correspondence and the second correspondence for description.

In a first implementation, the network element management device receives both the first correspondence and the second correspondence from the second network management device. For example, the first network management device sends the profile information shown in Table 1 to the second network management device, and the profile information includes the first correspondence and the second correspondence. The second network management device determines the first correspondence and the second correspondence, and sends the first correspondence and the second correspondence to the network element management device. In this implementation, after the second network management device determines the first correspondence and the second correspondence, the second network management device notifies the network element management device of an operation and maintenance service that each of the first network management device and the second network management device can provide. In this implementation, an interaction process is simple, an interaction process between the first network management device and the network element management device is saved, and signaling overheads of the first network management device are reduced.

In a second implementation, the network element management device receives the first correspondence from the first network management device, and receives the second correspondence from the second network management device. For example, the first network management device sends the profile information shown in Table 1 to the second network management device, and the profile information includes the first correspondence and the second correspondence. The second network management device determines the first correspondence and the second correspondence, and sends the second correspondence to the network element management device. The first network management device sends the first correspondence to the network element management device.

In a third implementation, the network element management device receives both the first correspondence and the second correspondence from the first network management device. For example, the first network management device determines both the first operation and maintenance service that can be undertaken by the first network management device and the second operation and maintenance service that the first network management device expects to lease the second network management device to provide, that is, the first network management device determines the first correspondence (the correspondence between the first network management device and the first operation and maintenance service) and the second correspondence (the correspondence between the second network management device and the second operation and maintenance service). The first network management device sends the first correspondence and the second correspondence to the network element management device. In this implementation, the first network management device directly sends the first correspondence and the second correspondence to the network element management device, that is, the first network management device notifies the network element management device of an operation and maintenance service that each of the first network management device and the second network management device can provide.

Step 303: The network element management device receives third operation and maintenance service information, where the third operation and maintenance service information is used to describe a third operation and maintenance service. If the third operation and maintenance service information is from the first network management device, and the third operation and maintenance service belongs to the first operation and maintenance service, the network element management device executes the third operation and maintenance service. Alternatively, if the third operation and maintenance service information is from the second network management device, and the third operation and maintenance service belongs to the second operation and maintenance service, the network element management device executes the third operation and maintenance service.

For example, the first network management device provides the first operation and maintenance service (for example, a PM service), and the second network management device is responsible for the second operation and maintenance service (for example, a CM service and an FM service). When the network element management device receives the third operation and maintenance service information sent by the second network management device, the third operation and maintenance service information is used to describe the third operation and maintenance service. If the third operation and maintenance service belongs to the second operation and maintenance service, for example, the third operation and maintenance service is a CM service, the network element management device determines, based on the second correspondence, that the CM service is provided by the second network management device, and the network element management device executes the CM service. For example, the network element management device creates a managed object instance (managed object instance, MOI), and sends a reply message of creating a managed object instance to the second network management device. The reply message includes a CM attribute list and a status of creating a managed object instance (for example, "stored" or "not stored").

Alternatively, when the network element management device receives the third operation and maintenance service information sent by the second network management device, if the third operation and maintenance service does not belong to the second operation and maintenance service (for example, the third operation and maintenance service is PM), the network element management device determines, based on the second correspondence, that the third operation and maintenance service is not provided by the second network management device. The network element management device does not execute the third operation and maintenance service. Optionally, the network element management device further sends a permission indication message to the second network management device. The permission indication message is used to notify the second network management device that the third operation and maintenance service is inconsistent with the second operation and maintenance service that can be provided by the second network management device.

Optionally, if the third operation and maintenance service information is from the first network management device, before the first network device sends the third operation and maintenance service information to the network element management device, the method further includes: The first network device determines that the third operation and maintenance service information belongs to the first operation and maintenance service. In other words, the first network device first determines that the first network device has a permission to provide the third operation and maintenance service, and then the first network device sends the third operation and maintenance service information to the network element management device. Similarly, if the third operation and maintenance service information is from the second network management device, before the second network device sends the third operation and maintenance service information to the network element management device, the method further includes: The second network device determines that the third operation and maintenance service information belongs to the second operation and maintenance service. In other words, the second network device first determines that the first network device has a permission to provide the second operation and maintenance service, and then the second network device sends the third operation and maintenance service information to the network element management device.

In this embodiment of this application, the first network management device and the second network management device collaborate to provide an operation and maintenance service for a network of the user of the enterprise. The network element management device receives the first operation and maintenance service information and/or the second operation and maintenance service information. The first operation and maintenance service information is used to describe the first operation and maintenance service provided by the first network management device, and the second operation and maintenance service information is used to describe the second operation and maintenance service provided by the second network management device. In other words, each of the first network management device and the second network management device has a network management permission. Network management devices of at least two parties collaborate to provide a network operation and maintenance service for the enterprise network. This can prevent a risk of privacy data leakage caused by a reason that all network operation and maintenance services are provided by the operator, and reduce network operation and maintenance costs undertaken by the enterprise.

For example, the first network management device is an NMS deployed by the enterprise, and the second network management device is an NMS deployed by the operator. Alternatively, the first network management device is an NMS deployed by the operator, and the second network management device is an NMS deployed by the enterprise. Alternatively, the first network management device belongs to an NMS deployed by a first enterprise, the second network management device belongs to an NMS deployed by a second enterprise, and the first enterprise and the second enterprise may be a same enterprise or different enterprises. The following embodiment uses an example in which the first network management device is the NMS deployed by the enterprise and the second network management device is the NMS deployed by the operator for description.

Figure 4:
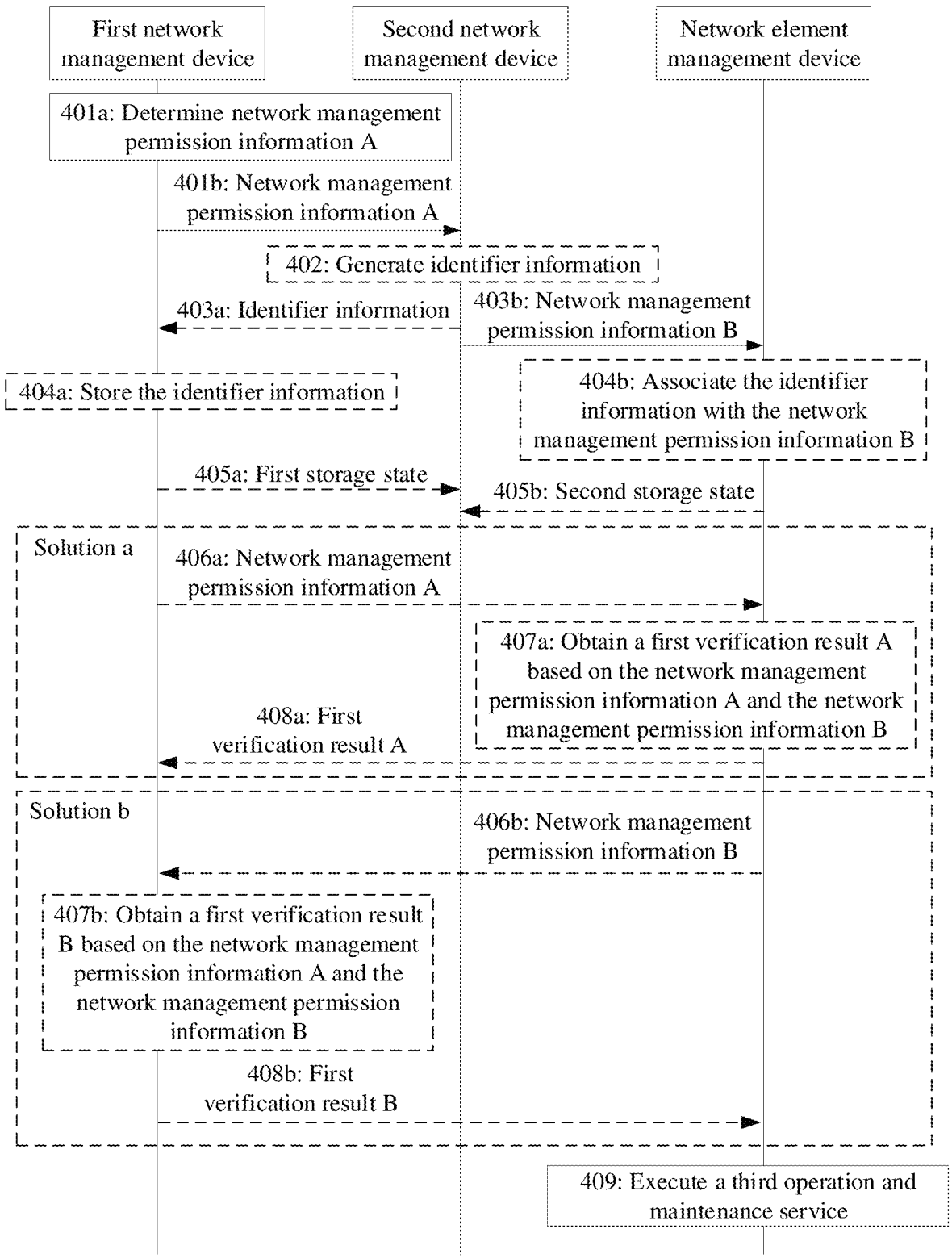
FIG. 4 is a schematic flowchart of network management method according to another embodiment of this application.

Refer to FIG. 4. This application provides another embodiment of a network management method. This embodiment corresponds to the technical solution in the first implementation of step 302 in the embodiment corresponding to FIG. 3. In other words, the network element management device receives both the first correspondence and the second correspondence from the second network management device.

Step 401a: A first network management device determines network management permission information A.

For example, the first network management device determines a first operation and maintenance service that can be undertaken by the first network management device. The first network management device determines the network management permission information A based on the first operation and maintenance service. The network management permission information A includes the first operation and maintenance service provided by the first network management device. Optionally, the network management permission information A further includes a second operation and maintenance service provided by a second network management device.

In an implementation, the first network management device obtains profile information, where the profile information is used to describe the network management permission information A. For example, a profile template is configured in the first network management device, or the first network management device receives a profile template from the second network management device. For example, the profile template may be a document, and the profile template includes various preset attributes. For example, as shown in Table 1, the preset attribute includes an operation and maintenance service attribute provided by the first network management device. Optionally, the preset attribute further includes one or more of the following: an attribute of an operation and maintenance service expected to be provided by the second network management device, an effective time attribute, an expiration time attribute, a location attribute of a user of an enterprise, and the like. Then, the first network management device determines the first operation and maintenance service that can be undertaken by the first network management device. Optionally, the first network management device further determines the second operation and maintenance service expected to be provided by the second network management device. Then, related information is written based on the preset attribute in the profile template, to obtain the profile information (as shown in Table 1).

Step 401b: The first network management device sends the network management permission information A to the second network management device. Correspondingly, the second network management device receives the network management permission information A from the first network management device.

The first network management device sends the network management permission information A to the second network management device, which may be either of the following two cases:

Case 1: If the network management permission information A includes the first operation and maintenance service provided by the first network management device, the first network management device sends the first operation and maintenance service information or a first correspondence to the second network management device. The first correspondence is a correspondence between the first network management device and the first operation and maintenance service.

Case 2: If the network management permission information A includes the first operation and maintenance service and the second operation and maintenance service, the first network management device sends the first correspondence and a second correspondence to the second network management device. The second correspondence is a correspondence between the second network management device and the second operation and maintenance service. For example, the first network management device sends the profile information shown in Table 1 to the second network management device, where the profile information includes the network management permission information A.

Through this step, the first network management device initiates negotiation on network management permissions for the two NMSs with the second network management device.

Step 402: The second network management device generates identifier information.

Step 402 is an optional step. For example, this step may be applied to one or more of the following two scenarios. In a scenario 1, the identifier information includes a first identifier. In a scenario 2, the identifier information includes a second identifier.

Scenario 1: When the second network management device provides a network operation and maintenance service for a plurality of enterprises, the second network management device generates the first identifier to distinguish between different users of the enterprises.

If there is a one-to-one correspondence between the user of the enterprise and the network management device, that is, when one network management device provides the service for only a user of one enterprise, the first identifier may be used to identify the first network management device, or used to identify a user of an enterprise corresponding to the first network management device.

If one network management device provides services for a plurality of users, the first identifier may be used to identify different users of the enterprises. For example, if the first network management device may be leased by a user of a first enterprise, or may be leased by a user of a second enterprise, the first identifier includes an identifier of the user of the first enterprise and an identifier of the user of the second enterprise.

For example, when the first identifier is used to identify a user of an enterprise, the second network management device generates one account ID for the user of the enterprise as identifier information of the user of the enterprise. For example, an identifier A is generated for a user of an enterprise A, and an identifier B is generated for a user of an enterprise B.

Scenario 2: When a system includes network management devices corresponding to a plurality of operators, the second identifier is used to identify different operators. For example, an NMS layer of the system includes three network management devices: a network management device A, a network management device B, and a network management device C. The network management device A is an NMS deployed by the enterprise, the network management device B is an NMS deployed by a first operator, and the network management device C is an NMS deployed by a second operator. The network management device A, the network management device B, and the network management device C jointly provide a network operation and maintenance service for the user of the enterprise. For example, the first operator is a primary operator that provides the network operation and maintenance service, and the second operator is a secondary operator that provides the network operation and maintenance service. The network management device B is the second network management device in this step. After the network management device B receives network management permission information sent by the network management device C, the network management device B generates an identifier C for an operator corresponding to the network management device C, to differentiate the operator corresponding to the network management device C. The identifier C is used to identify the operator corresponding to the network management device C. When the network management device B sends a network management permission to the network element management device, the identifier C is carried, so that the network element management device distinguishes a network management permission of the secondary operator.

The identifier information can be used as an index in subsequent steps. When the first network management device, the second network management device, and the network element management device send interaction information to each other, the interaction information carries the identifier information. When receiving the interaction information, the first network management device, the second network management device, or the network element management device may determine, based on the identifier information, a user of an enterprise or an operator corresponding to the received interaction information. In the following embodiment, a function of the identifier information is similar to that described herein. For ease of description, the following embodiment uses an example in which the identifier information is the first identifier, and the first identifier is used to identify the user of the enterprise for description. For example, identifier information generated by the second network management device for a user of an enterprise A is an identifier A.

Optionally, the solution further includes the following step: The second network management device obtains geographical location information of the user of the enterprise from the profile information. The second network management device queries, based on a geographical location of the user of the enterprise, a target network element near the location of the user of the enterprise. For example, the second management device queries, based on the geographical location (for example, "XX city in XX province") of the user of the enterprise, the target network element (for example, a base station A) closest to the geographical location, and then the second network management device determines a target network element management device closest to the target network element. In this way, the target network element management device can manage the target network element nearby, reducing a delay of interaction between the target network element management device and the target network element. Optionally, the network element management device in the following steps may be the target network element management device.

Step 403*a*: The second network management device sends the identifier information to the first network management device. Correspondingly, the first network management device receives the identifier information from the second network management device.

For example, the second network management device sends the identifier information to the first network management device by using a first message.

Optionally, the first message may further carry an IP address of the network element management device. The first network management device may communicate with the network element management device based on the IP address of the network element management device.

Optionally, the first message or the identifier information is further used to notify the first network management device that the second network management device agrees to (or determines) division of management permissions of both the first network management device and the second network management device for the network management permission information.

In this step, the second network management device sends the generated identifier information to the first network management device. When step 402 is not performed, this step may not be performed.

In step 403a, if the second network management device has no objection to the network management permission information in the profile information, in other words, if the second network management device determines the network management permission information in the profile information, the second network management device performs the following step 403b. Optionally, if the second network management device has an objection to the network management permission information in the profile information, in other words, if the second network management device denies the network management permission information in the profile information, the method in this embodiment further includes the following step: The second network management device sends a first feedback message to the first network management device, where the first feedback message indicates that the second network management device has the objection to the network management permission information. After receiving the first feedback message, the first network management device updates the network management permission information, and modifies the second operation and maintenance service for which the second network management device is responsible, for example, updates a second operation and maintenance service A to a second operation and maintenance service B. Then, step 401 is performed again. The first network management device sends updated profile information to the second network management device, so that the first network management device and the second network management device can agree on a division result of management permissions for the two NMSs.

Step 403b: The second network management device sends network management permission information B to the network element management device. The network element management device receives the network management permission information B. Optionally, the network management permission information B carries the identifier information.

For example, the second network management device sends the network management permission information B to the network element management device by using a first service information transfer request.

Optionally, before step 403b, the method further includes: The second network management device determines the network management permission information B.

For the case 1 in step 401b, if the network management permission information A includes the first operation and maintenance service provided by the first network management device, before step 403b, the method further includes: The second network management device determines the network management permission information B based on the network management permission information A. For example, the second network management device determines, based on the first operation and maintenance service in the network management permission information A, that an operation and maintenance service other than the first operation and maintenance service is the second operation and maintenance service provided by the second network management device.

For the case 2 in step 401b, if the network management permission information A includes the first operation and maintenance service and the second operation and maintenance service, before step 403b, the method further includes: The second network management device determines the network management permission information B based on the network management permission information A. For example, the network management permission information B may be the same as the network management permission information A, or may be different from the network management permission information A.

The following are cases in which the network management permission information B is different from the network management permission information A: For example, the second network management device receives the network management permission information A, and may modify the network management permission. For example, the network element management permission A includes the second operation and maintenance service provided by the second network management device. For example, the second operation and maintenance service is a CM service, and the second network management device may modify the CM service into a subset A of an operation of the operation and maintenance service in a CM type, to obtain the network management permission information B. Optionally, the second network management device further sends the network management permission information B to the first network management device.

For example, after the second network management device receives the profile information, the second network management device determines division of management permissions of both the first network management device and the second network management device.

For example, the second network management device sends the first service information transfer request to the network element management device based on the IP address of the network element management device. Optionally, the IP address of the network element management device is configured in the second network management device.

Optionally, the second network management device sends an IP address of the first network management device to the network element management device. For example, the second network management device obtains the IP address of the first network management device from the profile information. The network element management device may communicate with the first network management device based on the IP address of the first network management device.

It should be noted that step 403a and step 403b are not limited in a time sequence. Step 403a and step 403b may be performed at the same time. Alternatively, step 403a may be performed before step 403b. Alternatively, step 403a may be performed after step 403b.

Step 404a: After the first network management device receives the identifier information sent by the second network management device, the first network management device stores the identifier information. Optionally, the first network management device stores the IP address of the network element management device carried in the first message.

Step 404b: After the network element management device receives the network management permission information B from the second network management device, the network element management device associates the identifier information in the first service information transfer request with the network management permission information B.

In the network management permission information B, the correspondence between the first network management device and the first operation and maintenance service is referred to as the "first correspondence", and the correspondence between the second network management device and the second operation and maintenance service is referred to as the "second correspondence".

The network element management device determines a first association relationship between the identifier information and the first correspondence, and a second association relationship between the identifier information and the second correspondence. When the second network management device provides a network operation and maintenance service for the users of the plurality of enterprise, the network element management device may distinguish between network operation and maintenance permissions of different users of the enterprises by determining the first association relationship and the second association relationship. For example, the identifier A is used to identify the user of the enterprise A. A correspondence between a network management device of the enterprise A and the first operation and maintenance service is a first correspondence A. A correspondence between a network management device of the operator and the second operation and maintenance service is a second correspondence A. The identifier B is used to identify the user of the enterprise B. A correspondence between a network management device of the enterprise B and the first operation and maintenance service is a first correspondence B. A correspondence between the network management device of the operator and the second operation and maintenance service is a second correspondence B. The network element management device can determine a network operation and maintenance permission of the user of the enterprise A by determining the first association relationship A between the identifier A and the first correspondence A, and the second association relationship A between the identifier A and the second correspondence A. The network element management device can determine a network operation and maintenance permission of the user of the enterprise B by determining the first association relationship B between the identifier B and the first correspondence B, and the second association relationship B between the identifier B and the second correspondence B.

It should be noted that step 404b is an optional step. For example, when the second network management device provides a network operation and maintenance service for a user of one enterprise, step 404b may not be performed.

When step 404b is performed, step 404a and step 404b are not limited in a time sequence. Step 404a and step 404b may be performed at the same time. Alternatively, step 404a may be performed before step 404b. Alternatively, step 404a may be performed after step 404b.

Step 405a: The first network management device sends a first storage state to the second network management device. Correspondingly, the second network management device receives the first storage state from the first network management device.

For example, the first network management device sends the first storage state by using a first state reply.

Optionally, the first state reply includes the identifier information and the first storage state. The first storage state indicates whether the first network management device successfully stores the identifier information. For example, the first storage state includes a state flag bit. For example, when the flag bit is "1", the first storage state indicates that the first network management device successfully stores the identifier information. When the flag bit is "0", the first storage state indicates that the first network management device fails to store the identifier information. If the first network management device fails to store the identifier information, the first state reply triggers the second network management device to resend the identifier information to the first network management device.

Step 405b: The network element management device sends a second storage state to the second network management device. Correspondingly, the second network management device receives the second storage state from the network element management device.

For example, the network element management device may send the second storage state by using a second state reply.

Optionally, the second state reply includes the identifier information and the second storage state. The second storage state indicates whether the network element management device successfully associates and stores the identifier information and the network management permission information. The second storage state includes a state flag bit. For example, when the flag bit is "1", the first storage state indicates that the identifier information and the network management permission information are successfully associated and stored. When the flag bit is "0", the first storage state indicates that the identifier information and the network management permission information fail to be associated and stored. If the first storage state indicates that the identifier information and the network management permission information fail to be associated and stored, the second state reply triggers the second network management device to resend the identifier information and the network management permission information to the network element management device.

It should be noted that step 405a and step 405b are not limited in a time sequence. Step 405a and step 405b may be performed at the same time. Alternatively, step 405a may be performed before step 405b. Alternatively, step 405a may be performed after step 405b. Step 405a and step 405b are optional steps, or may not be performed.

Step 409: The network element management device receives third operation and maintenance service information, where the third operation and maintenance service information is used to describe a third operation and maintenance service. If the third operation and maintenance service information is from the first network management device, and the third operation and maintenance service belongs to the first operation and maintenance service, the network element management device executes the third operation and maintenance service. Alternatively, if the third operation and maintenance service information is from the second network management device, and the third operation and maintenance service belongs to the second operation and maintenance service, the network element management device executes the third operation and maintenance service.

For this step, refer to the description of step 303 corresponding to FIG. 3. Details are not described herein again.

In this embodiment, the first network management device initiates negotiation on the management permissions for the two NMSs with the second network management device. After the second network management device determines the network management permission information, the second network management device sends the network management permission information from the first network management device to the network element management device. The first network management device and the second network management device collaborate to provide an operation and maintenance service for a user network. Each of the first network management device and the second network management device has a separate management permission. Network management devices of at least two parties collaborate to provide a network operation and maintenance service for the enterprise network. This can prevent a risk of privacy data leakage caused by a reason that all network operation and maintenance services are provided by the operator, and reduce network operation and maintenance costs undertaken by the enterprise.

In this embodiment, the network element management device receives the network management permission information from the second network management device. To ensure accuracy of the network management permission information received by the network element management device, in other words, to ensure that the network management permission information stored in the network element management device meets a requirement of the first network management device, the first network management device may further request the network element management device to verify the network management permission information. Optionally, this solution further includes a verification process. The verification process may be any one of the following two solutions: Solution a: The network element management device performs verification. Refer to steps 406a to 408a. Solution b: The first network management device performs verification. Refer to steps 406b to 408b.

The following is an implementation of the solution a:

Step 406a: The first network management device sends the network management permission information A to the network element management device. Correspondingly, the network element management device receives the network management permission information A from the first network management device.

For example, the first network management device sends the network management permission information A to the network element management device by using a first verification request A. The first verification request A indicates the network element management device to verify the network management permission information A.

For ease of description, the network management permission information A indicates network management permission information in the first network management device, and the network management permission information B indicates network management permission information in the network element management device.

The first verification request A includes the network management permission information A. Optionally, the first verification request A further includes the identifier information. The identifier information is used to identify the first network device or the user of the enterprise corresponding to the first network device.

For example, in the network management permission information A, a correspondence between the first network management device and the first operation and maintenance service is referred to as a "third correspondence", and the correspondence between the second network management device and the second operation and maintenance service is referred to as a "fourth correspondence". The network management permission information B includes the "first correspondence" and the "second correspondence". It should be noted that each of the "first correspondence" and the "third correspondence" is a correspondence between the first network management device and the first operation and maintenance service, and is only used to distinguish between the "correspondence between the first network management device and the first operation and maintenance service" in the network element management device and the "correspondence between the first network management device and the first operation and maintenance service" in the first network management device. The "correspondence between the first network management device and the first operation and maintenance service" in the network element management device is referred to as the "first correspondence". The "correspondence between the first network management device and the first operation and maintenance service" in the first network management device is referred to as the third correspondence. Similarly, each of the "second correspondence" and the "fourth correspondence" is a correspondence between the second network management device and the second operation and maintenance service.

Step 407a: The network element management device obtains a first verification result A based on the network management permission information A and the network management permission information B.

The network element management device determines the first verification result A based on the first correspondence, the second correspondence, the third correspondence, and the fourth correspondence. The first verification result A includes a verification success or a verification failure. The verification success indicates that the first correspondence is consistent with the third correspondence, and the second correspondence is consistent with the fourth correspondence. The verification failure indicates that the first correspondence is inconsistent with the third correspondence, or the second correspondence is inconsistent with the fourth correspondence, or the first correspondence is inconsistent with the third correspondence, and the second correspondence is inconsistent with the fourth correspondence.

Step 408a: The network element management device sends the first verification result A to the first network management device. Correspondingly, the first network management device receives the first verification result A from the network element management device.

For example, the network element management device may send the first verification result A by using first reply information. Optionally, the first reply information further includes the identifier information.

When the first verification result indicates a verification success, it indicates that division of the management permissions for the two NMSs stored in the network element management device meets the requirement of the first network management device. When the first verification result indicates a verification failure, it indicates that division of management permissions for the two NMSs stored in the network element management device does not meet the requirement of the first network management device, and the first reply information triggers the first network management device to perform another process. For example, the first network management device resends the network management permission information A to the second network management device, to query whether the network management permission information B sent by the second network management device to the network element management device is consistent with the resent network management permission information A. The another process performed by the first network management device is not described herein. In short, when the first verification result indicates the verification failure, the first network management device renegotiates on the network management permissions for the two NMSs with the second network management device, to ensure that the first network management device, the second network management device, and the network element management device agree on the network management permissions for the two NMSs. Optionally, the network element management device associates the first verification result with the identifier information. The first verification result is associated with the identifier information, so that when there are users of a plurality of enterprises in the system, verification results of different users of the enterprises can be distinguished.

The following is an implementation of the solution b:

Step 406b: The network element management device sends the network management permission information B to the first network management device. Correspondingly, the first network management device receives the network management permission information B from the network element management device.

For example, the network element management device sends the network management permission information B to the first network management device by using a first verification request B. Optionally, the first verification request B includes the identifier information.

For example, in step 403b, the first service information transfer request includes the IP address of the first network management device (for example, obtained from the profile information). The network element management device may send the first verification request B to the first network management device based on the IP address of the first network management device. The first verification request B indicates the first network management device to verify the network management permission information B.

Step 407b: The first network management device obtains the first verification result B based on the network management permission information B and the network management permission information A.

The first network management device determines the first verification result B based on the first correspondence, the second correspondence, the third correspondence, and the fourth correspondence. The first verification result B includes a verification success or a verification failure. The verification success indicates that the first correspondence is consistent with the third correspondence, and the second correspondence is consistent with the fourth correspondence. The verification failure indicates that the first correspondence is inconsistent with the third correspondence, or the second correspondence is inconsistent with the fourth correspondence, or the first correspondence is inconsistent with the third correspondence, and the second correspondence is inconsistent with the fourth correspondence.

In step 408b, the first network management device sends the first verification result B to the network element management device. Correspondingly, the network element management device receives the first verification result B from the first network management device.

For example, the first network management device sends the first verification result B by using first reply information B. Optionally, the first verification result B includes the identifier information and the first verification result B.

Through the foregoing steps, the network element management device determines an operation and maintenance service for which each of the first network management device and the second network management device is responsible.

In this embodiment, the first network management device initiates negotiation on the management permissions for the two NMSs with the second network management device. After the second network management device determines the network management permission information, the second network management device sends the network management permission information from the first network management device to the network element management device. Then, the first network management device may determine the network management permission information with the network element management device, or the network element management device may determine the network management permission information with the first network management device. In this case, the management permissions for the two NMSs are determined between the three devices, namely, the first network management device, the second network management device, and the network element management device. The first network management device, the second network management device, and the network element management device agree on the management permissions for the two NMSs.

Figure 5A:
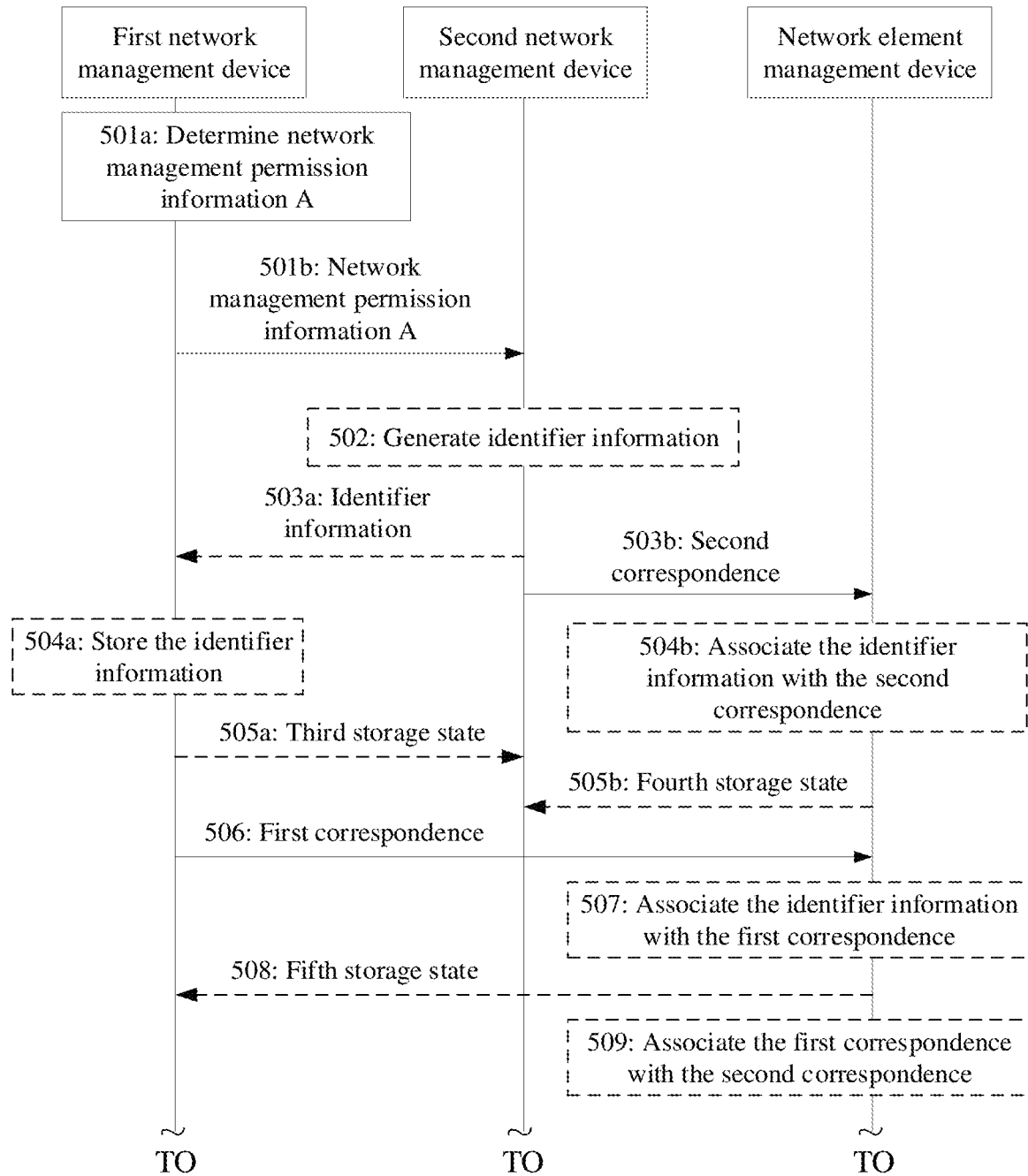
FIG. 5A and FIG. 5B are a schematic flowchart of a network management method according to another embodiment of this application.
Figure 5B:
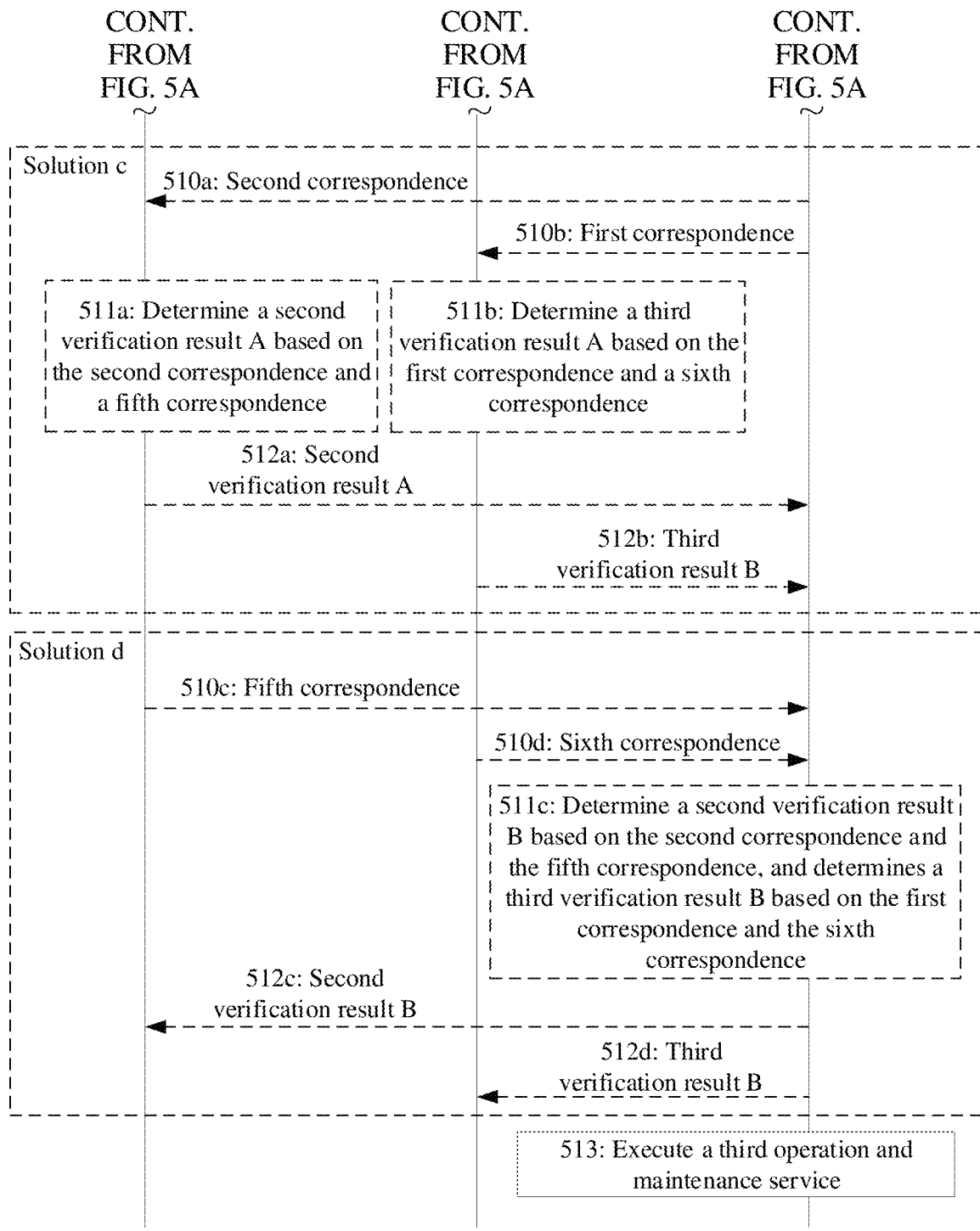

Refer to FIG. 5A and FIG. 5B. This application provides another embodiment of a network management method. This embodiment corresponds to the technical solution in the second implementation of step 302 in the embodiment corresponding to FIG. 3. A main difference between this embodiment and the embodiment corresponding to FIG. 4 lies in that: In the embodiment corresponding to FIG. 4, the second network management device sends the network management permission information to the network element management device. In this embodiment, a first network management device and a second network management device notify a network element management device of an operation and maintenance service that each of the first network management device and the second network management device can provide.

Step 501a: A first network management device determines network management permission information A.

This step is similar to step 401a in the embodiment corresponding to FIG. 4. For this step, refer to the description of step 401a. Details are not described herein again.

Step 501b: The first network management device sends network management permission information A to the second network management device. Correspondingly, the second network management device receives the network management permission information A from the first network management device.

This step is similar to step 401b in the embodiment corresponding to FIG. 4. For this step, refer to the description of step 401b. Details are not described herein again.

Step 502: The second network management device generates identifier information.

For step 502, refer to the description of step 402 in the embodiment corresponding to FIG. 4. For the identifier information in step 502, refer to the description of the identifier information in step 402. Details are not described herein again.

It should be noted that step 502 is an optional step, and may be not performed. The following step 503a, step 504a, and step 505a are steps related to interaction between the first network management device and the second network management device. The following step 503b, step 504b, and step 505b are steps related to interaction between the second network management device and the network element management device.

Step 503a: The second network management device sends the identifier information to the first network management device. Correspondingly, the first network management device receives the identifier information from the second network management device.

For example, the second network management device sends the identifier information by using a second message.

Optionally, the second message further carries an IP address of the network element management device.

Optionally, the second message may be further used to notify the first network management device that the second network management device agrees to (or determines) division of management permissions for the two NMSs in the network management permission information. The second network management device sends the IP address of the network element management device to the first network management device. The IP address of the network element management device is used for communication between the first network management device and the network element management device.

In step 503*a*, if the second network management device has no objection to the network management permission information in profile information, in other words, if the second network management device determines that the second operation and maintenance service can be provided for the user of the enterprise, the second network management device performs the following step 503*b*. Optionally, if the second network management device has an objection to the network management permission information in the profile information, in other words, if the second network management device denies the network management permission information in the profile information, the method in this embodiment further includes the following step: The second network management device sends a second feedback message to the first network management device, where the second feedback message indicates that the second network management device has the objection to the network management permission information. After receiving the second feedback message, the first network management device updates the network management permission information, and modifies the second operation and maintenance service for which the second network management device is responsible, for example, updates a second operation and maintenance service A to a second operation and maintenance service B. Then, step 501 is performed again. The first network management device sends updated profile information to the second network management device, so that the first network management device and the second network management device can agree on a division result of management permissions for the two NMSs.

Step 503*b*: The second network management device sends a second correspondence between the second network management device and the second operation and maintenance service to the network element management device. Correspondingly, the network element management device receives the second correspondence from the second network management device.

Optionally, before step 503*b*, the method further includes: The second network management device determines the second correspondence based on the network management permission information A received in step 501*b*.

If the network management permission information A includes the first operation and maintenance service provided by the first network management device, before step 503*b*, the method further includes: The second network management device determines the second correspondence based on the network management permission information A. For example, the second network management device determines, based on the first operation and maintenance service in the network management permission information A, that an operation and maintenance service other than the first operation and maintenance service is the second operation and maintenance service provided by the second network management device. Then, the second correspondence is determined.

If the network management permission information A includes the first operation and maintenance service and the second operation and maintenance service, before step 503*b*, the method further includes: The second network management device determines the second correspondence based on the network management permission information A.

For example, the second network management device sends the second correspondence by using a second service information transfer request. Optionally, the second service information transfer request further includes the identifier information.

For example, after the second network management device determines that the second operation and maintenance service can be provided for the user of the enterprise, the second network management device sends the second service information transfer request to the network element management device. Optionally, the second network management device obtains an IP address of the first network management device in the profile information, and the second service information transfer request further includes the IP address of the first network management device. The IP address of the first network management device is used by the network element management device to communicate with the first network management information.

This step is a main step different from the embodiment in FIG. 4. A main difference between this step and step 403*b* in the embodiment corresponding to FIG. 4 lies in that, in step 403*b*, the network management permission information sent by the second network management device to the network element management device includes a correspondence between the first network management device and the first operation and maintenance service, and a correspondence between the second network management device and the second operation and maintenance service. In this step, the second network management device sends, to the network element management device, the second operation and maintenance service for which the second network management device is responsible, that is, the second network management device sends a second correspondence between the second network management device and the second operation and maintenance service to the network element management device.

It should be noted that step 503*a* and step 503*b* are not limited in a time sequence. Step 503*a* and step 503*b* may be performed at the same time. Alternatively, step 503*a* may be performed before step 503*b*. Alternatively, step 503*a* may be performed after step 503*b*.

Step 504*a*: After the first network management device receives the identifier information sent by the second network management device, the first network management device stores the identifier information. Optionally, the first network management device stores the IP address of the network element management device.

Step 504*b*: After the network element management device receives the second correspondence, the network element management device associates the identifier information with the second correspondence.

In this embodiment, the correspondence between the second network management device and the second operation and maintenance service in the network element management device is referred to as the "second correspondence". The network element management device may establish an association relationship between the identifier information and the "second correspondence". When the second network management device provides a network operation and maintenance service for users of a plurality of enterprises, the network element management device may distinguish between network operation and maintenance permissions of users of different enterprises by establishing the association relationship between the identifier information and the "second correspondence".

It should be noted that step 504*a* and step 504*b* are not limited in a time sequence. Step 504*a* and step 504*b* may be performed at the same time. Alternatively, step 504*a* may be performed before step 504*b*. Alternatively, step 504*a* may be performed after step 504*b*. Step 504*a* and step 504*b* are optional steps, or may not be performed.

Step 505*a*: The first network management device sends a third storage state to the second network management device. Correspondingly, the second network management device receives the third storage state from the first network management device.

For example, the first network management device sends the third storage state by using a third state reply.

Optionally, the third state reply further includes the identifier information. The third storage state indicates whether the first network management device successfully stores the identifier information.

This step is similar to step 405*a* in the embodiment corresponding to FIG. 4. Refer to the description of step 405*a*. Details are not described herein again.

Step 505*b*: The network element management device sends a fourth storage state to the second network management device. Correspondingly, the second network management device receives the fourth storage state from the network element management device.

For example, the network element management device sends the fourth storage state by using a fourth state reply.

Optionally, the fourth state reply further includes the identifier information. The fourth storage state indicates whether the network element management device successfully stores the second correspondence and the identifier information. A fourth storage state A indicates that the second correspondence and the identifier information are successfully stored. A fourth storage state B indicates that the second correspondence and the identifier information fail to be stored. When the fourth storage state B indicates that the second correspondence and the identifier information fail to be stored, the fourth state reply triggers the second network management device to resend the identifier information and the second correspondence to the network element management device.

It should be noted that step 505*a* and step 505*b* are not limited in a time sequence. Step 505*a* and step 505*b* may be performed at the same time. Alternatively, step 505*a* may be performed before step 505*b*. Alternatively, step 505*a* may be performed after step 505*b*. Step 505*a* and step 505*b* are optional steps, or may not be performed.

Step 506: The first network management device sends a first correspondence between the first network management device and the first operation and maintenance service to the network element management device. Correspondingly, the network element management device receives the first correspondence between the first network management device and the first operation and maintenance service from the first network management device.

For example, the first network management device sends the first network management device by using a third service information transfer request.

Optionally, the third service information transfer request may further include the identifier information.

This step is another main step different from the embodiment corresponding to FIG. 4. In the embodiment corresponding to FIG. 4, the network management permission information (including the correspondence between the first network management device and the first operation and maintenance service, and the correspondence between the second network management device and the second operation and maintenance service) in the network element management device is received from the second network management device. In this step, the first network management device also needs to send, to the network element management device, the first operation and maintenance service that can be undertaken by the first network management device. In other words, the correspondence (also referred to as the "first correspondence") between the first network management device and the first operation and maintenance service in the network element management device is received from the first network management device.

Step 507: After the network element management device receives the first correspondence between the first network management device and the first operation and maintenance service, the network element management device associates the identifier information with the first correspondence.

Step 508: The network element management device sends a fifth storage state to the first network management device. Correspondingly, the first network management device receives the fifth storage state from the network element management device.

For example, the network element management device sends the fifth storage state by using a fifth state reply.

Optionally, the fifth state reply further includes the identifier information. A fifth storage state A indicates that the identifier information and the first correspondence are successfully associated and stored. A fifth storage state B indicates that the identifier information and the first correspondence fail to be associated and stored. Optionally, when the fifth storage state B indicates the storage failure, the fifth state reply triggers the first network management device to resend the first correspondence and the identifier information to the network element management device.

Step 507 and step 508 are optional steps, and may not be performed.

Step 509: The network element management device associates the first correspondence with the second correspondence.

When the second network management device provides a network operation and maintenance services for users of the plurality of enterprises, the network element management device may associate, based on the identifier information, the first operation and maintenance service provided by the first network management device with the second operation and maintenance service provided by the second network management device, to obtain network management permission information of users of different enterprises. It may be understood that the associating the identifier information with the network management permission information may also mean to establish an association relationship between the identifier information and the first correspondence, and establishing an association relationship between the identifier information and the second correspondence.

Step 513: The network element management device receives third operation and maintenance service information, where the third operation and maintenance service information is used to describe a third operation and maintenance service. If the third operation and maintenance service information is from the first network management device, and the third operation and maintenance service belongs to the first operation and maintenance service, the network element management device executes the third operation and maintenance service. Alternatively, if the third operation and maintenance service information is from the second network management device, and the third operation and maintenance service belongs to the second operation and maintenance service, the network element management device executes the third operation and maintenance service.

For this step, refer to the description of step 303 corresponding to FIG. 3. Details are not described herein again.

In this embodiment, the two NMSs notify the network element management device of an operation and maintenance service provided by each of the two NMSs. To be specific, the first network management device initiates negotiation on the management permissions for the two NMSs with the second network management device. After determining the network management permission information, the second network management device sends the correspondence between the second network management device and the second operation and maintenance service to the network element management device. The first network management device and the second network management device collaborate to provide an operation and maintenance service for a user network. Each of the first network management device and the second network management device has a separate management permission. Network management devices of at least two parties collaborate to provide a network operation and maintenance service for the enterprise network. This can prevent a risk of privacy data leakage caused by a reason that all network operation and maintenance services are provided by the operator, and reduce network operation and maintenance costs undertaken by the enterprise.

In this embodiment, the network element management device receives the second correspondence from the second network management device and receives the first correspondence from the first network management device. Therefore, to ensure accuracy of the network management permission information received by the network element management device, the network element management device may perform cross-validation on the first correspondence and the second correspondence. Optionally, for a verification step, refer to the following solution c and solution d.

Solution c: The first network management device and the second network management device perform verification. Refer to steps 510*a* to 512*a* and steps 510*b* to 512*b*. Solution d: The network element management device performs verification. Refer to steps 510*c* to 512*c* and steps 510*d* to 512*d*.

The following is an implementation of the solution c:

Step 510*a*: The network element management device sends the second correspondence to the first network management device. Correspondingly, the first network management device receives the second correspondence from the network element management device.

For example, the network element management device sends the second correspondence by using a second verification request A. The second correspondence is the correspondence between the second network management device and the second operation and maintenance service in the network element management device.

Optionally, the second verification request A further includes the identifier information.

Step 510*b*: The network element management device sends the first correspondence to the second network management device. Correspondingly, the second network management device receives the first correspondence from the network element management device.

For example, the network element management device sends the first correspondence to the second network management device by using a third verification request A. The first correspondence is the correspondence between the first network management device and the first operation and maintenance service in the network element management device.

Optionally, the third verification request includes the identifier information.

It should be noted that step 510*a* and step 510*b* are not limited in a time sequence. Step 510*a* and step 510*b* may be performed at the same time. Alternatively, step 510*a* may be performed before step 510*b*. Alternatively, step 510*a* may be performed after step 510*b*.

Step 511*a*: The first network management device determines a second verification result A based on the second correspondence and a fifth correspondence.

The fifth correspondence is a correspondence between the second operation and maintenance service and the second network management device in the first network management device. The second correspondence is the correspondence between the second operation and maintenance service and the second network management device in the network element management device. It should be noted that each of the second correspondence and the fifth correspondence is a correspondence between the second network management device and the second operation and maintenance service. In this embodiment, to distinguish between the "correspondence between the second network management device and the second operation and maintenance service" in the network element management device and the "correspondence between the second network management device and the second operation and maintenance service" in the first network management device, the "correspondence between the second network management device and the second operation and maintenance service" in the network element management device is referred to as the "second correspondence", and the "correspondence between the second network management device and the second operation and maintenance service" in the first network management device may be referred to as the "fifth correspondence".

The second verification result A includes a verification success or a verification failure. The verification success indicates that the second correspondence is consistent with the fifth correspondence. The verification failure indicates that the second correspondence is inconsistent with the fifth correspondence.

512*a*: The first network management device sends the second verification result A to the network element management device. Correspondingly, the network element management device receives the second verification result A from the first network management device.

For example, the first network management device sends the second verification result A to the network element management device by using second reply information.

Optionally, the second reply information further includes the identifier information.

If the second verification result A indicates the verification success, it indicates that the network management permission information in the network element management device meets the requirement of the first network management device. If the second verification result A indicates the verification failure, it indicates that the network management permission information in the network element management device does not meet the requirement of the first network management device. The first network management device needs to perform another process. For example, the first network management device resends the correspondence between the first network element management device and the first operation and maintenance service to the network element management device. Alternatively, the first network management device resends the profile information.

Step 511b: The second network management device determines a third verification result A based on the first correspondence and a sixth correspondence.

The sixth correspondence is a correspondence between the first operation and maintenance service and the first network management device in the second network management device. The first correspondence is the correspondence between the first operation and maintenance service and the first network management device in the network element management device. It should be noted that each of the first correspondence and the sixth correspondence is a correspondence between the first network management device and the first operation and maintenance service. In this embodiment, to distinguish between the "correspondence between the first network management device and the first operation and maintenance service" in the network element management device and the "correspondence between the second network management device and the second operation and maintenance service" in the second network management device, the "correspondence between the first network management device and the first operation and maintenance service" in the network element management device is referred to as the "first correspondence", and the "correspondence between the first network management device and the first operation and maintenance service" in the second network management device is referred to as the "sixth correspondence".

The third verification result A includes a verification success or a verification failure. The verification success indicates that the first correspondence is consistent with the sixth correspondence. The verification failure indicates that the first correspondence is inconsistent with the sixth correspondence.

Step 512b: The second network management device sends the third verification result A to the network element management device. Correspondingly, the network element management device receives the third verification result A from the second network management device.

For example, the second network management device sends the third verification result to the network element management device by using third reply information A.

Optionally, the third reply information A includes the identifier information.

If the third verification result indicates the verification success, it indicates that the network management permission information in the network element management device meets a requirement of the second network management device. For example, if the third verification result indicates the verification failure, it indicates that the network management permission information in the network element management device does not meet the requirement of the second network management device. The second network management device needs to perform another process. For example, the second network management device sends a verification failure message to the first network management device. The verification failure message indicates that both the first correspondence and the sixth correspondence fail to be verified. After receiving the verification failure message, the first network management device resends the profile information to the second network management device, and resends the correspondence between the first network management device and the first operation and maintenance service to the network element management device.

It should be noted that step 511a and step 511b are not limited in a time sequence. Step 511a and step 511b may be performed at the same time. Alternatively, step 511a may be performed before step 511b. Alternatively, step 511a may be performed after step 511b. Step 512a and step 512b are not limited in a time sequence. Step 512a and step 512b may be performed at the same time. Alternatively, step 512a may be performed before step 512b. Alternatively, step 512a may be performed after step 512b.

Through the foregoing steps, the network element management device determines an operation and maintenance service for which each of the first network management device and the second network management device is responsible.

In this embodiment, the network element management device separately performs cross-validation on the correspondence with the first network management device and the second network management device, that is, the network element management device verifies the second correspondence with the first network management device and verifies the first correspondence with the second network management device. In this case, the management permissions for the two NMSs are determined between the three devices, namely, the first network management device, the second network management device, and the network element management device. Finally, the first network management device, the second network management device, and the network element management device agree on the management permissions for the two NMSs.

The following is an implementation of the solution d:

Step 510c: The first network management device sends the fifth correspondence to the network element management device. Correspondingly, the network element management device receives the fifth correspondence from the first network management device.

For example, the first network management device sends the fifth correspondence by using a second verification request B. The fifth correspondence is a correspondence between the second operation and maintenance service and the second network management device in the first network management device.

Step 510d: The second network management device sends the sixth correspondence to the network element management device. Correspondingly, the network element management device receives the sixth correspondence from the second network management device. The sixth correspondence is a correspondence between the first operation and maintenance service and the first network management device in the second network management device.

For example, the second network management device sends the sixth correspondence to the network element management device by using a third verification request B. The sixth correspondence is a correspondence between the first operation and maintenance service and the first network management device in the second network management device.

It should be noted that step 510c and step 510d are not limited in a time sequence. Step 510c and step 510d may be performed at the same time. Alternatively, step 510c may be performed before step 510d. Alternatively, step 510c may be performed after step 510d.

Step 511c: The network element management device determines a second verification result B based on the second correspondence and the fifth correspondence, and determines a third verification result B based on the first correspondence and the sixth correspondence.

The second correspondence is the correspondence between the second operation and maintenance service and the second network management device in the network element management device. The second verification result B includes a verification success or a verification failure. The verification success indicates that the second correspondence is consistent with the fifth correspondence. The verification failure indicates that the second correspondence is inconsistent with the fifth correspondence. The third verification result B includes a verification success or a verification failure. The verification success indicates that the first correspondence is consistent with the sixth correspondence. The verification failure indicates that the first correspondence is inconsistent with the sixth correspondence.

Step 512c: The network element management device sends the second verification result B to the first network management device. Correspondingly, the first network management device receives the second verification result B from the network element management device.

For example, the network element management device sends the second verification result B to the first network management device by using second reply information B.

If the second verification result B indicates the verification success, it indicates that the network management permission information in the network element management device meets the requirement of the first network management device. If the second verification result B indicates the verification failure, it indicates that the network management permission information in the network element management device does not meet the requirement of the first network management device. The first network management device needs to perform another process. For example, the first network management device resends the correspondence between the first network element management device and the first operation and maintenance service to the network element management device. Alternatively, the first network management device resends the profile information.

The first correspondence is the correspondence between the first operation and maintenance service and the first network management device in the network element management device.

Step 512d: The network element management device sends the third verification result B to the second network management device. Correspondingly, the second network management device receives the third verification result B from the network element management device.

For example, the second network management device sends the third verification result B to the network element management device by using third reply information B.

If the third verification result B indicates the verification success, it indicates that the network management permission information in the network element management device meets a requirement of the second network management device. For example, if the third verification result indicates the verification failure, it indicates that the network management permission information in the network element management device does not meet the requirement of the second network management device. The second network management device needs to perform another process. For example, the second network management device sends a verification failure message to the first network management device. The verification failure message indicates that both the first correspondence and the sixth correspondence fail to be verified. After receiving the verification failure message, the first network management device resends the profile information to the second network management device, and resends the correspondence between the first network management device and the first operation and maintenance service to the network element management device.

It should be noted that step 512c and step 512d are not limited in a time sequence. Step 512c and step 512d may be performed at the same time. Alternatively, step 512c may be performed before step 512d. Alternatively, step 512c may be performed after step 512d.

Through the foregoing steps, the network element management device determines an operation and maintenance service for which each of the first network management device and the second network management device is responsible.

In this embodiment, the network element management device verifies both the second correspondence and the first correspondence in the network element management device. In this case, the management permissions for the two NMSs are determined between the three devices, namely, the first network management device, the second network management device, and the network element management device. Finally, the first network management device, the second network management device, and the network element management device agree on the management permissions for the two NMSs.

For example, for step 303 in the embodiment corresponding to FIG. 3, step 409 in the embodiment corresponding to FIG. 4, and step 513 in the embodiment corresponding to FIG. 5B, the first network management device and the second network management device collaborate to perform operation and maintenance management on the network, and the network element management device executes third operation and maintenance service based on the third operation and maintenance service information from the first network management device or the second network management device. For details, refer to the following Example 1 and Example 2.

Figure 6:
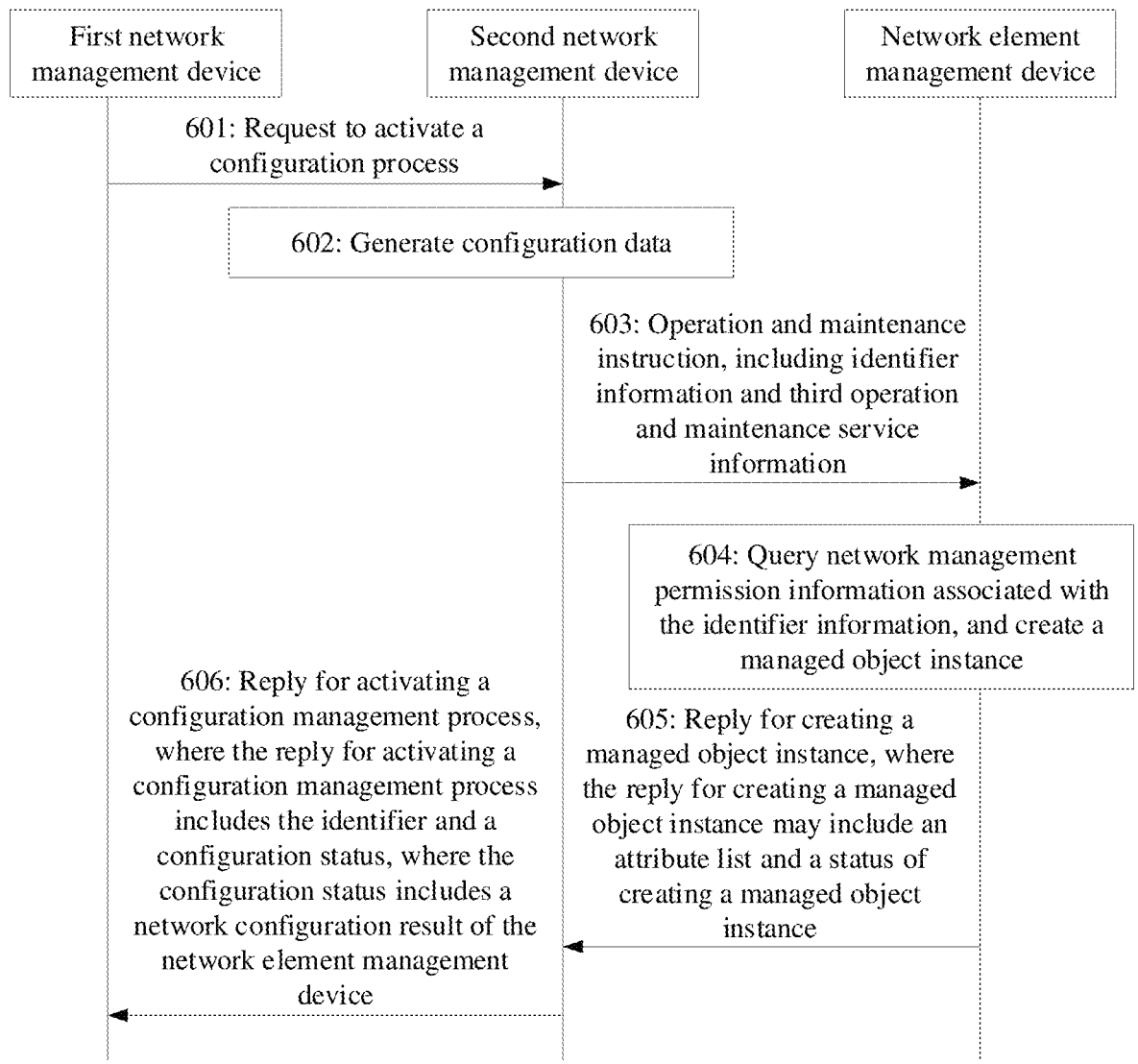
FIG. 6 is a schematic flowchart of an example in which a second network management device manages a CM service according to an embodiment of this application.

Example 1: FIG. 6 shows an example in which a first network management device is an NMS deployed by a user of an enterprise, a second network management device is an NMS deployed by an operator, the user of the enterprise entrusts a second operation and maintenance service to the operator, and the second operation and maintenance service is CM in one application scenario.

Step 601: The first network management device sends a request to activate a configuration management process (activate configuration management process) to the second network management device. The request to activate a configuration process includes identifier information of the user of the enterprise and a network configuration request (configuration requirement). The network configuration request indicates a requirement for network configuration.

Step 602: After the second network management device receives the request to activate a configuration process from the first network management device, the second network management device queries, based on the identifier information, network management permission information associated with the identifier information, and the second network management device determines whether the second network management device is responsible for a CM service of the user of the enterprise. If the second network management device is responsible for the CM service of the user of the enterprise, the second network management device generates configuration data based on the network configuration request.

Step 601 and step 602 are steps in which the first network management device triggers the second network management device to provide the second operation and maintenance service.

The following step 603 to step 605 are a process in which the second network management device sends an operation and maintenance instruction to a network element management device, and the network element management device executes the CM. A difference between the following step 603 to step 605 and a process of other approaches in which an NMS delivers a delivery and maintenance instruction to a network element management device and the network element management device executes CM is that the network element management device can verify whether the second network management device has a permission to invoke a CM operation.

Step 603: The second network management device sends the operation and maintenance instruction to the network element management device, where the operation and maintenance instruction includes the identifier information and third operation and maintenance service information. The third operation and maintenance service information is used to describe the CM service, that is, the operation and maintenance instruction is a request to create a managed object instance. The request to create a managed object instance further includes a managed object class (managed object class), a managed object instance (managed object instance) identifier, a reference object instance (reference object instance) identifier, and an attribute list (attribute list).

Step 604: The network element management device queries the network management permission information associated with the identifier information (for example, including a correspondence between the first network management device and a first operation and maintenance service, and a correspondence between the second network management device and the second operation and maintenance service). The network element management device verifies, based on the network management permission information, whether the CM service is provided by the second network management device. When the network element management device determines that the CM service is provided by the second network management device, the network element management device creates a managed object instance (managed object instance, MOI).

Optionally, when the network element management device determines that the CM service is not invoked by the second network management device, the network element management device sends a permission indication message to the second network management device. The permission indication message is used to notify the second network management device that the third operation and maintenance service does not belong to the second operation and maintenance service that can be provided by the second network management device. The network element management device refuses to execute the third operation and maintenance service.

Step 605: The network element management device sends a reply for creating a managed object instance to the second network management device, where the reply for creating a managed object instance may include an attribute list (attribute list) and a status of creating a managed object instance (for example, "created").

Step 606: The second network management device sends a reply for activating a configuration management process to the first network management device, where the reply for activating a configuration management process may include the identifier information and a configuration status (configuration status), and the configuration status includes a network configuration result (the attribute list and the status of creating a managed object instance) of the network element management device.

Figure 7:
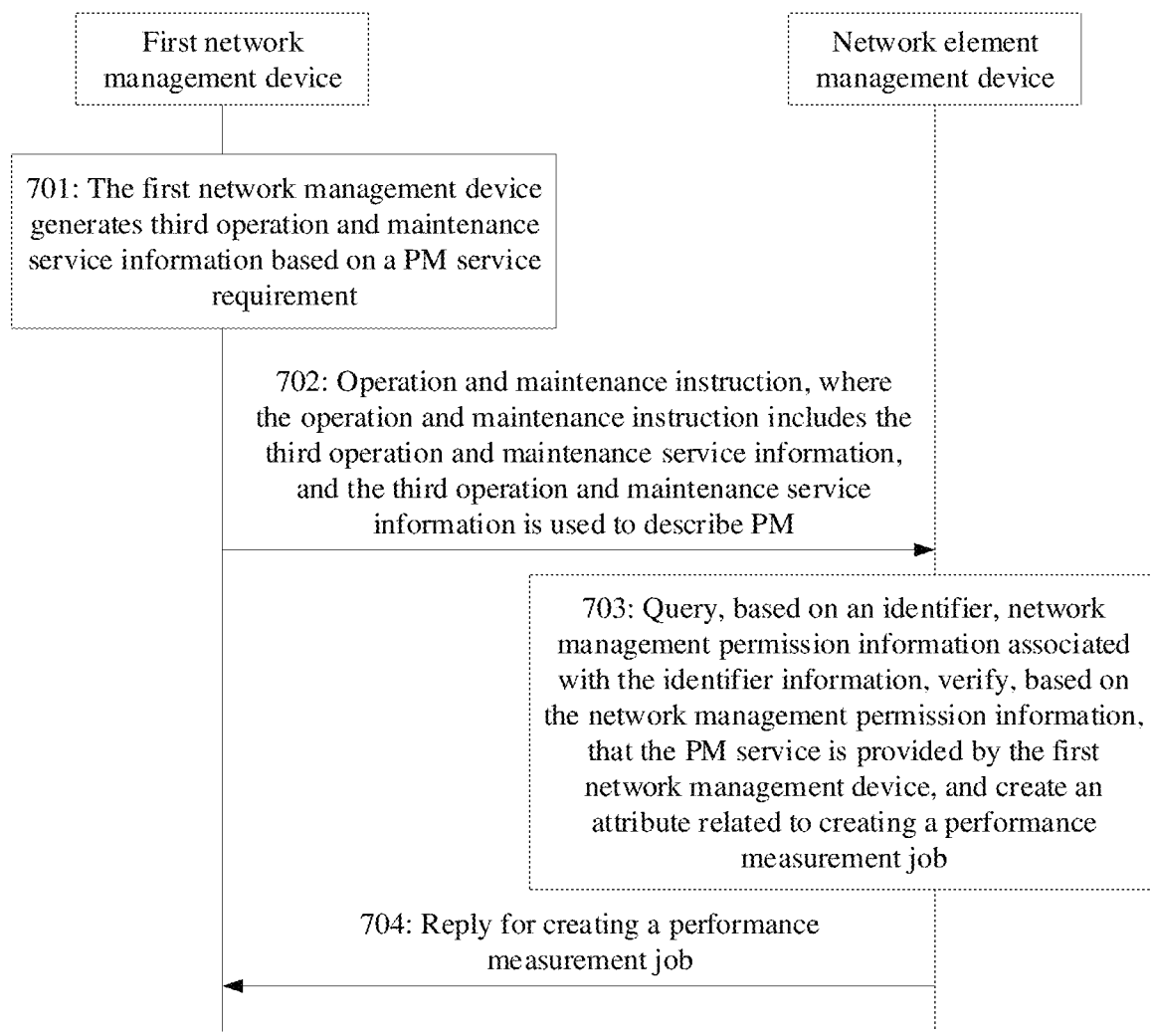
FIG. 7 is a schematic flowchart of an example in which a first network management device manages a PM service according to an embodiment of this application.

Example 2: FIG. 7 shows an example in which a first network management device is an NMS operated by a user of an enterprise, a second network management device is an NMS of an operator, the first network management device is responsible for a first operation and maintenance service, and the first operation and maintenance service is PM in another application scenario. In this example, the first network management device may directly and independently provide the first operation and maintenance service.

Step 701: The first network management device generates third operation and maintenance service information based on a PM service requirement.

Step 702: The first network management device sends an operation and maintenance instruction to a network element management device, where the operation and maintenance instruction includes the third operation and maintenance service information, the third operation and maintenance service information is used to describe PM, and the third operation and maintenance service information carries identifier information and a related attribute for creating a performance measurement job.

Step 703: The network element management device queries, based on the identifier information, network management permission information associated with the identifier information, and the network element management device verifies, based on the network management permission information, whether the PM service is provided by the first network management device. After the network element management device verifies, based on the network management permission information, that the PM service is provided by the first network management device, the network element management device creates an attribute related to creating a performance measurement job. Optionally, when the network element management device determines that the PM service is not provided by the first network management device, the network element management device sends a permission indication message to the first network management device. The permission indication message is used to notify the first network management device that the third operation and maintenance service does not belong to the first operation and maintenance service that can be provided by the first network management device. The network element management device refuses to execute the third operation and maintenance service.

Step 704: The network element management device sends a reply for creating a performance measurement job to the first network management device, where the reply for creating a performance measurement job includes the identifier information and an attribute related to creating a performance measurement job.

In Example 1, the first network management device may trigger the second operation and maintenance service provided by the second network management device. In Example 2, the first network management device may directly and independently provide the operation and maintenance service. In Example 1 and Example 2, in a process of executing the operation and maintenance instruction, the network element management device may query the network management permission information associated with the identifier information, and after determining that a network management device that sends the third operation and maintenance service information has the management permission, the network element management device executes the third operation and maintenance service. The operation and maintenance instructions of the two NMSs do not conflict.

Figure 8:
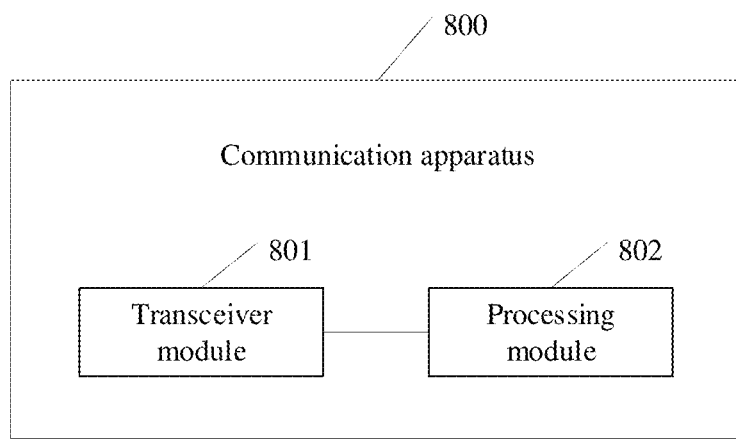
FIG. 8 is a schematic diagram of a structure of a communication apparatus according to embodiments of this application.

Refer to FIG. 8. This application provides an embodiment of a communication apparatus. The communication apparatus is configured to perform the method performed by the network element management device in the foregoing method embodiments. The communication apparatus may be a network element management device, or the communication apparatus may be a chip in the network element management device, or the communication apparatus may be a processor in the network element management device. This embodiment uses an example in which the communication apparatus is the network element management device for description. The communication apparatus 800 includes a transceiver module 801 and a processing module 802.

The transceiver module 801 is configured to receive first operation and maintenance service information and/or second operation and maintenance service information. The first operation and maintenance service information is used to describe a first operation and maintenance service provided by a first network management device. The second operation and maintenance service information is used to describe a second operation and maintenance service provided by a second network management device.

The processing module 802 is configured to determine a first correspondence between a first operation and maintenance service and a first network management device, and a second correspondence between a second operation and maintenance service and a second network management device.

The transceiver module 801 is further configured to receive third operation and maintenance service information. The third operation and maintenance service information is used to describe a third operation and maintenance service. If the third operation and maintenance service information is from the first network management device, and the third operation and maintenance service belongs to the first operation and maintenance service, the processing module 802 is further configured to execute the third operation and maintenance service. Alternatively, if the third operation and maintenance service information is from the second network management device, and the third operation and maintenance service belongs to the second operation and maintenance service, the processing module 802 is further configured to execute the third operation and maintenance service.

Optionally, the transceiver module 801 is a transceiver. The transceiver has a sending function and/or a receiving function. Optionally, the transceiver is replaced with a receiver and/or a transmitter.

Optionally, the transceiver module 801 is a communication interface. Optionally, the communication interface may be an input/output interface or a transceiver circuit. The input/output interface may include an input interface and an output interface. The transceiver circuit may include an input interface circuit and an output interface circuit.

Optionally, the processing module 802 is a processor, and the processor is a general-purpose processor, a dedicated processor, or the like. Optionally, the processor includes a transceiver unit configured to implement receiving and sending functions. For example, the transceiver unit is a transceiver circuit, an interface, or an interface circuit. A transceiver circuit, an interface, or an interface circuit configured to implement receiving and sending functions are separately deployed, and optionally, are integrated and deployed together. The transceiver circuit, the interface, or the interface circuit may be configured to read and write code/data. Alternatively, the transceiver circuit, the interface, or the interface circuit may be configured to transmit or transfer a signal.

In an implementation, the processing module 802 may be a processing apparatus, and some or all functions of the processing apparatus may be implemented by using software.

Optionally, some or all functions of the processing apparatus may be implemented by using software. In this case, the processing apparatus may include a memory and a processor. The memory is configured to store a computer program, and the processor reads and executes the computer program stored in the memory, to perform corresponding processing and/or steps in any method embodiment.

Optionally, the processing apparatus may only include the processor. The memory configured to store the computer program is located outside the processing apparatus, and the processor is connected to the memory through a circuit/wire, to read and execute the computer program stored in the memory.

Further, the transceiver module 801 is configured to perform step 301 and step 303 in the embodiment corresponding to FIG. 3; step 403*b*, step 405*b*, step 406*a*, step 408*a*, step 406*b*, and step 408*b* in the embodiment corresponding to FIG. 4; and step 503*b*, step 505*b*, step 506, step 508, step 510*a*, step 510*c*, step 510*b*, step 510*d*, step 512*a*, step 512*c*, step 512*b*, and step 512*d* in the embodiment corresponding to FIG. 5A and FIG. 5B. The processing module 802 is configured to perform step 302 in the embodiment corresponding to FIG. 3; step 402, step 404*b*, step 409, and step 407*a* in the embodiment corresponding to FIG. 4; and step 504*b*, step 507, step 509, step 513, and step 511*c* in the embodiment corresponding to FIG. 5A and FIG. 5B.

Specifically, in an optional implementation, the transceiver module 801 is further configured to receive the first correspondence and the second correspondence from the first network management device. The first correspondence includes the first operation and maintenance service information, and the second correspondence includes the second operation and maintenance service information. Alternatively, the transceiver module is further configured to receive the first correspondence and the second correspondence from the second network management device. The first correspondence includes the first operation and maintenance service information, and the second correspondence includes the second operation and maintenance service information. Alternatively, the transceiver module is further configured to: receive the first correspondence from the first network management device and receive the second correspondence from the second network management device. The first correspondence includes the first operation and maintenance service information, and the second correspondence includes the second operation and maintenance service information.

In an optional implementation, if receiving the first operation and maintenance service information and the second operation and maintenance service information from the second network management device, the transceiver module 801 is further configured to receive a third correspondence and a fourth correspondence from the first network management device. The third correspondence is a correspondence between the first operation and maintenance service and the first network management device in the first network management device. The fourth correspondence is a correspondence between the second operation and maintenance service and the second network management device in the first network management device. The processing module 802 is further configured to determine a first verification result based on the first correspondence, the second correspondence, the third correspondence, and the fourth correspondence. The first verification result includes a verification success or a verification failure. The verification success indicates that the first correspondence is consistent with the third correspondence, and the second correspondence is consistent with the fourth correspondence. The verification failure indicates that the first correspondence is inconsistent with the third correspondence, or the second correspondence is inconsistent with the fourth correspondence, or the first correspondence is inconsistent with the third correspondence, and the second correspondence is inconsistent with the fourth correspondence.

In an optional implementation, if the first correspondence is received from the first network management device, and the second correspondence is received from the second network management device, the transceiver module 801 is further configured to: send the second correspondence to the first network management device; send the first correspondence to the second network management device; receive a second verification result from the first network management device, where the second verification result includes a verification success or a verification failure, the verification success of the second verification result indicates that the second correspondence is consistent with a fifth correspondence, and the verification failure of the second verification result indicates that the second correspondence is inconsistent with the fifth correspondence, and the fifth correspondence is a correspondence between the second operation and maintenance service and the second network management device in the first network management device; and receive a third verification result from the second network management device. The third verification result includes a verification success or a verification failure. The verification success of the third verification result indicates that the first correspondence is consistent with a sixth correspondence. The verification failure of the third verification result indicates that the first correspondence is inconsistent with the sixth correspondence. The sixth correspondence is a correspondence between the first operation and maintenance service in the second network management device and the first network management device.

In an optional implementation, the transceiver module 801 is further configured to receive identifier information. The identifier information is used to identify one or more of the following: the first network management device, a user of an enterprise corresponding to the first network management device, or an operator corresponding to the first network management device. The processing module 802 is further configured to determine a first association relationship between the identifier information and the first correspondence, and a second association relationship between the identifier information and the second correspondence.

In an optional implementation, the transceiver module 801 is further configured to obtain time information, where the time information indicates effective time and/or expiration time of the first operation and maintenance service information.

Figure 9:
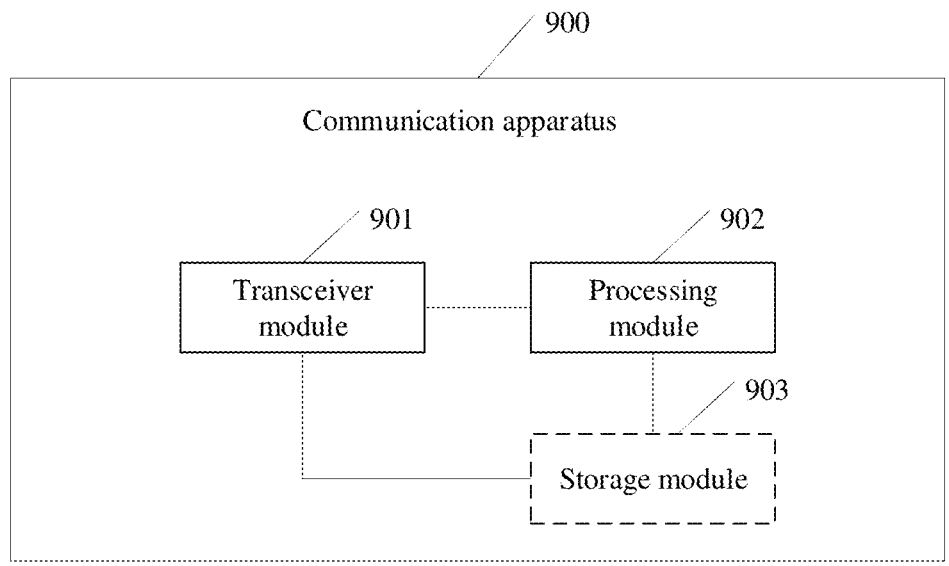
FIG. 9 is a schematic diagram of a structure of a communication apparatus according to further embodiments of this application.

Refer to FIG. 9. This application provides another embodiment of a communication apparatus. The communication apparatus is configured to perform the method performed by the first network management device or the second network management device in the foregoing method embodiments. The communication apparatus may be the first network management device or the second network management device in the foregoing method embodiments, or the communication apparatus may be a chip in the first network management device or the second network management device, or the communication apparatus may be a processor in the first network management device or the second network management device. The communication apparatus 900 includes a transceiver module 901 and a processing module 902. Optionally, the communication apparatus further includes a storage module 903.

The processing module 902 is configured to determine first operation and maintenance service information, where the first operation and maintenance service information is used to describe a first operation and maintenance service for which the first network management device is responsible.

The transceiver module 901 is configured to send the first operation and maintenance service information, where the first operation and maintenance service information is used to determine a first correspondence between the first operation and maintenance service and the first network management device.

Optionally, the transceiver module 901 is a transceiver. The transceiver has a sending function and/or a receiving function. Optionally, the transceiver is replaced with a receiver and/or a transmitter.

Optionally, the transceiver module 901 is a communication interface. Optionally, the communication interface may be an input/output interface or a transceiver circuit. The input/output interface may include an input interface and an output interface. The transceiver circuit may include an input interface circuit and an output interface circuit.

Optionally, the processing module 902 is a processor, and the processor is a general-purpose processor, a dedicated processor, or the like. Optionally, the processor includes a transceiver unit configured to implement receiving and sending functions. For example, the transceiver unit is a transceiver circuit, an interface, or an interface circuit. A transceiver circuit, an interface, or an interface circuit configured to implement receiving and sending functions are separately deployed, and optionally, are integrated and deployed together. The transceiver circuit, the interface, or the interface circuit may be configured to read and write code/data. Alternatively, the transceiver circuit, the interface, or the interface circuit may be configured to transmit or transfer a signal.

In an implementation, the processing module 902 may be a processing apparatus, and some or all functions of the processing apparatus may be implemented by using software.

Optionally, some or all functions of the processing apparatus may be implemented by using software. In this case, the processing apparatus may include a memory and a processor. The memory is configured to store a computer program, and the processor reads and executes the computer program stored in the memory, to perform corresponding processing and/or steps in any method embodiment.

Optionally, the processing apparatus may only include the processor. The memory configured to store the computer program is located outside the processing apparatus, and the processor is connected to the memory through a circuit/wire, to read and execute the computer program stored in the memory.

In a design, when the communication apparatus is configured to perform the method performed by the first network management device in the foregoing method embodiments, the processing module 902 is configured to perform step 401a, step 404a, and step 407b in the embodiment corresponding to FIG. 4, and step 501a, step 504a, and step 511a in the embodiment corresponding to FIG. 5A and FIG. 5B; and the transceiver module 901 is configured to perform step 401b, step 403a, step 405a, step 406a, step 408a, step 406b, and step 408b in the embodiment corresponding to FIG. 4, and step 501b, step 503a, step 505a, step 506, step 508, step 509, step 512a, and step 512c in the embodiment corresponding to FIG. 5A and FIG. 5B. The storage module 903 is configured to perform step 404a in the embodiment corresponding to FIG. 4 and step 504a in the embodiment corresponding to FIG. 5A.

In another design, when the communication apparatus is configured to perform the method performed by the second network management device in the foregoing method embodiments, the processing module 902 is configured to perform step 402 in the embodiment corresponding to FIG. 4, and step 502 and step 511b in the embodiment corresponding to FIG. 5A and FIG. 5B. The transceiver module 901 is configured to perform step 401b, step 403a, step 403b, step 405a, and step 405b in the embodiment corresponding to FIG. 4, and step 501b, step 503a, step 503b, step 505a, step 505b, step 509, step 512b, and step 512d in the embodiment corresponding to FIG. 5A and FIG. 5B.

Specifically, in an optional implementation, the transceiver module 901 is further configured to send a second correspondence. The second correspondence is a correspondence between a second operation and maintenance service and a second network management device in the first network management device.

In an optional implementation, the transceiver module 901 is further configured to send the first correspondence to a network element management device or the second network management device. The first correspondence includes the first operation and maintenance service information.

In an optional implementation, the transceiver module 901 is further configured to receive a seventh correspondence of a second network management device from the network element management device. The seventh correspondence is a correspondence between a second operation and maintenance service in the second network management device and the second network management device.

The processing module 902 is further configured to determine a fourth verification result based on the seventh correspondence and the second correspondence. The second correspondence is a correspondence between the second operation and maintenance service and the second network management device in the first network management device.

The transceiver module 901 is further configured to send the fourth verification result to the network element management device. The fourth verification result includes a verification success or a verification failure. The verification success of the fourth verification result indicates that the seventh correspondence is consistent with the second correspondence. The verification failure of the fourth verification result indicates that the seventh correspondence is inconsistent with the second correspondence.

In an optional implementation, the processing module 902 is further configured to receive the first operation and maintenance service information from the second network management device. Alternatively, the first network management device generates the first operation and maintenance service information.

In an optional implementation, the transceiver module 901 is further configured to obtain time information, where the time information indicates effective time and/or expiration time of the first operation and maintenance service information.

In an optional implementation, the transceiver module 901 is further configured to obtain identifier information. The identifier information is used to identify one or more of the following: the first network management device, a user of an enterprise corresponding to the first network management device, or an operator corresponding to the first network management device.

The processing module 902 is further configured to determine a first association relationship between the identifier information and the first correspondence.

Figure 10:
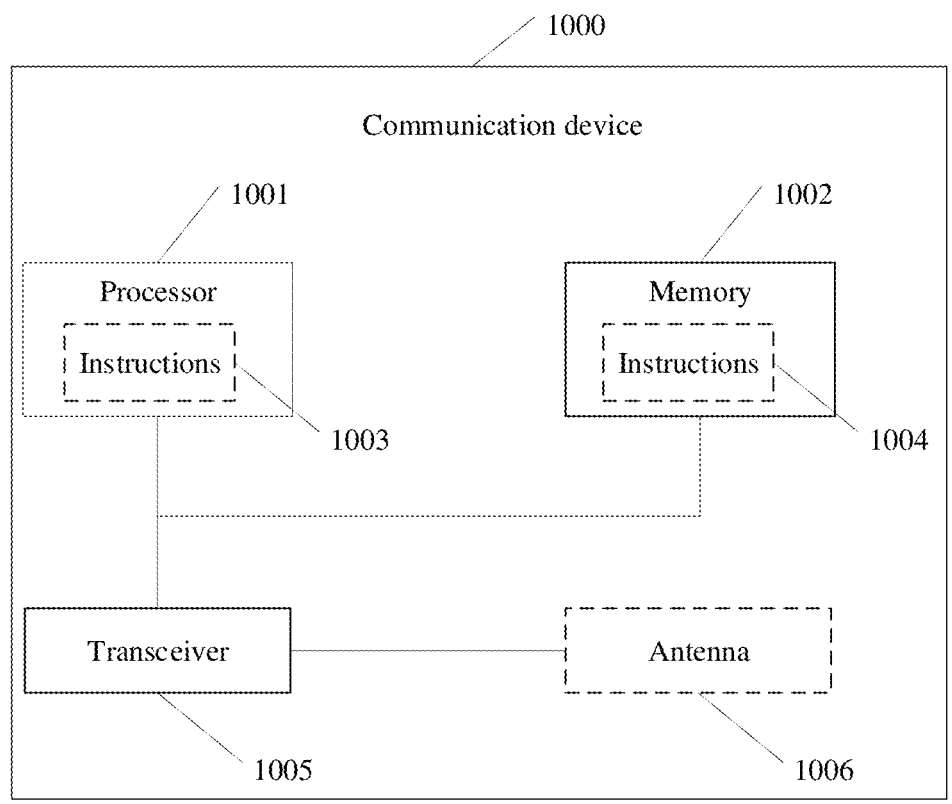
FIG. 10 is a schematic diagram of a structure of a communication device according to an embodiment of this application.

Refer to FIG. 10. An embodiment of this application further provides a communication device. The communication device may be configured to perform the method performed by the network element management device in the foregoing method embodiments; or the communication device may be configured to perform the method performed by the first network management device in the foregoing method embodiments; or the communication device may be configured to perform the method performed by the second network management device in the foregoing method embodiments. For details, refer to the description in the foregoing method embodiments.

The communication device 1000 may include one or more processors 1001. The processor 1001 may also be referred to as a processing unit, and may implement a specific control function. The processor 1001 may be a general-purpose processor or a dedicated processor. A central processing unit may be configured to control the communication device, execute a software program, and process data of the software program.

In an optional design, the processor 1001 may store instructions 1003, and the instructions 1003 may be run by the processor, so that the communication device 1000 performs the method described in the foregoing method embodiments.

In another optional design, the processor 1001 may include a transceiver unit configured to implement receiving and sending functions. For example, the transceiver unit may be a transceiver circuit, an interface, or an interface circuit. A transceiver circuit, an interface, or an interface circuit configured to implement receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In another possible design, the communication device 1000 may include a circuit. The circuit may implement a sending function or a receiving function in the foregoing method embodiments.

The communication device 1000 may include one or more memories 1002. The memory may store instructions 1004. The instructions may be run on the processor, so that the communication device 1000 performs the method described in the foregoing method embodiments. Optionally, the memory may further store data. Optionally, the processor may also store instructions and/or data. The processor and the memory may be separately disposed, or may be integrated together.

Optionally, the communication device 1000 may further include a transceiver 1005 and/or an antenna 1006. The processor 1001 may be referred to as a processing unit, and controls the communication device 1000. The transceiver 1005 may be referred to as a transceiver unit, a transceiver, a transceiver circuit, a transceiver communication device, a transceiver module, or the like, and is configured to implement sending and receiving functions.

An embodiment of this application provides a non-transitory computer-readable storage medium, configured to store a computer program or instructions. When the computer program or the instructions are executed, a computer is enabled to perform the method performed by the network element management device in the foregoing method embodiments. Alternatively, when the computer program or the instructions are executed, a computer is enabled to perform the method performed by the first network management device in the foregoing method embodiments. Alternatively, when the computer program or the instructions are executed, a computer is enabled to perform the method performed by the second network management device in the foregoing method embodiments.

An embodiment of this application provides a chip. The chip includes a processor and a communication interface. The communication interface is, for example, an input/output interface, a pin, or a circuit. The processor is configured to read instructions to perform the method performed by the network element management device in the method embodiments. Alternatively, the processor is configured to read instructions to perform the method performed by the first network management device in the method embodiments. Alternatively, the processor is configured to read instructions to perform the method performed by the second network management device in the method embodiments.

An embodiment of this application provides a computer program product. The computer program product includes computer program code. When the computer program code is executed by a computer, the computer is enabled to perform the method performed by the network element management device in the foregoing method embodiments. Alternatively, when the computer program code is executed by a computer, the computer is enabled to perform the method performed by the first network management device in the foregoing method embodiments; or the computer is enabled to perform the method performed by the second network management device in the foregoing method embodiments.

In conclusion, the foregoing embodiments are only intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

The invention claimed is:

1. A network management method, performed at a network element management device, and comprising:
    receiving first operation and maintenance service information and second operation and maintenance service information, wherein
        the first operation and maintenance service information describes a first operation and maintenance service provided by a first network management device, and
        the second operation and maintenance service information describes a second operation and maintenance service provided by a second network management device;
    determining a first correspondence between the first operation and maintenance service and the first network management device, and a second correspondence between the second operation and maintenance service and the second network management device;
    receiving third operation and maintenance service information, wherein the third operation and maintenance service information describes a third operation and maintenance service;
    in response to the third operation and maintenance service information being from the first network management device, and the third operation and maintenance service belonging to the first operation and maintenance service, executing the third operation and maintenance service; and
    in response to the third operation and maintenance service information being from the second network management device, and the third operation and maintenance service belonging to the second operation and maintenance service, executing the third operation and maintenance service.

2. The network management method according to claim 1, wherein the receiving the the first operation and maintenance service information and the second operation and maintenance service information comprises:
    receiving the first correspondence and the second correspondence from the first network management device, wherein the first correspondence comprises the first operation and maintenance service information, and the second correspondence comprises the second operation and maintenance service information; or
    receiving the first correspondence and the second correspondence from the second network management device, wherein the first correspondence comprises the first operation and maintenance service information, and the second correspondence comprises the second operation and maintenance service information; or
    receiving the first correspondence from the first network management device, and receiving the second correspondence from the second network management device, wherein the first correspondence comprises the first operation and maintenance service information, and the second correspondence comprises the second operation and maintenance service information.

3. The network management method according to claim 1, wherein in response to the first operation and maintenance service information and the second operation and maintenance service information being received from the second network management device, the network management method further comprises:
    receiving a third correspondence and a fourth correspondence from the first network management device, wherein
        the third correspondence is a correspondence between the first operation and maintenance service and the first network management device in the first network management device, and
        the fourth correspondence is a correspondence between the second operation and maintenance service and the second network management device in the first network management device; and
    determining a first verification result based on the first correspondence, the second correspondence, the third correspondence, and the fourth correspondence, wherein
    the first verification result comprises a verification success or a verification failure;

the verification success indicates that the first correspondence is consistent with the third correspondence, and the second correspondence is consistent with the fourth correspondence; and the verification failure indicates that
- the first correspondence is inconsistent with the third correspondence, or
- the second correspondence is inconsistent with the fourth correspondence, or
- the first correspondence is inconsistent with the third correspondence, and the second correspondence is inconsistent with the fourth correspondence.

4. The network management method according to claim 1, wherein in response to the first correspondence being received from the first network management device, and the second correspondence being received from the second network management device, the network management method further comprises:
- sending the second correspondence to the first network management device;
- sending the first correspondence to the second network management device;
- receiving a second verification result from the first network management device, wherein
  - the second verification result comprises a verification success or a verification failure;
  - the verification success of the second verification result indicates that the second correspondence is consistent with a fifth correspondence;
  - the verification failure of the second verification result indicates that the second correspondence is inconsistent with the fifth correspondence; and
  - the fifth correspondence is a correspondence between the second operation and maintenance service and the second network management device in the first network management device; and
- receiving a third verification result from the second network management device, wherein
  - the third verification result comprises a verification success or a verification failure;
  - the verification success of the third verification result indicates that the first correspondence is consistent with a sixth correspondence;
  - the verification failure of the third verification result indicates that the first correspondence is inconsistent with the sixth correspondence; and
  - the sixth correspondence is a correspondence between the first operation and maintenance service and the first network management device in the second network management device.

5. The network management method according to claim 1, wherein the network management method further comprises:
- receiving identifier information, wherein the identifier information identifies at least one of:
  - the first network management device,
  - a user of an enterprise corresponding to the first network management device, or
  - an operator corresponding to the first network management device; and
- determining a first association relationship between the identifier information and the first correspondence, and a second association relationship between the identifier information and the second correspondence.

6. The network management method according to claim 1, wherein
- the first network management device belongs to a network management system of a first enterprise, and
- the second network management device belongs to a network management system of an operator or a network management system of a second enterprise.

7. The network management method according to claim 1, wherein
- each of the first operation and maintenance service information and the second operation and maintenance service information is a type of the corresponding first or second operation and maintenance service, comprising at least one of: configuration management (CM), fault management (FM), or performance management (PM); or
- each of the first operation and maintenance service information and the second operation and maintenance service information is an operation of the corresponding first or second operation and maintenance service.

8. The network management method according to claim 1, wherein the network management method further comprises:
- obtaining time information, wherein the time information indicates at least one of effective time or expiration time of the first operation and maintenance service information.

9. The network management method according to claim 1, wherein in response to the first operation and maintenance service information and the second operation and maintenance service information being received from the second network management device, the network management method further comprises:
- sending the first operation and maintenance service information and the second operation and maintenance service information to the first network management device; and
- receiving, from the first network management device, a first verification result determined by the first network management device based on the first correspondence, the second correspondence, a third correspondence, and a fourth correspondence, wherein
  - the third correspondence is a correspondence between the first operation and maintenance service and the first network management device in the first network management device;
  - the fourth correspondence is a correspondence between the second operation and maintenance service and the second network management device in the first network management device;
  - the first verification result comprises a verification success or a verification failure;
  - the verification success indicates that the first correspondence is consistent with the third correspondence, and the second correspondence is consistent with the fourth correspondence; and
  - the verification failure indicates that
    - the first correspondence is inconsistent with the third correspondence, or
    - the second correspondence is inconsistent with the fourth correspondence, or
    - the first correspondence is inconsistent with the third correspondence, and the second correspondence is inconsistent with the fourth correspondence.

10. The network management method according to claim 1, wherein in response to the first correspondence being received from the first network management device, and the second correspondence being received from the second network management device, the network management method further comprises:
- receiving a fifth correspondence from the first network management device, wherein the fifth correspondence is a correspondence between the second operation and maintenance service and the second network management device in the first network management device;
- receiving a sixth correspondence from the second network management device, wherein the sixth correspondence is a correspondence between the first operation and maintenance service and the first network management device in the second network management device;
- determining a second verification result based on the second correspondence received from the second network management device and the fifth correspondence received from the first network management device, wherein
  - the second verification result comprises a verification success or a verification failure;
  - the verification success of the second verification result indicates that the second correspondence is consistent with the fifth correspondence; and
  - the verification failure of the second verification result indicates that the second correspondence is inconsistent with the fifth correspondence; and
- determining a third verification result based on the first correspondence received from the first network management device and the sixth correspondence received from the second network management device, wherein
  - the third verification result comprises a verification success or a verification failure;
  - the verification success of the third verification result indicates that the first correspondence is consistent with the sixth correspondence; and
  - the verification failure of the third verification result indicates that the first correspondence is inconsistent with the sixth correspondence.

11. The network management method according to claim 1, wherein
- the network element management device determines, based on the first operation and maintenance service information, the first operation and maintenance service provided by the first network management device;
- the network element management device determines, based on the second operation and maintenance service information, the second operation and maintenance service provided by the second network management device;
- in response to the third operation and maintenance service information being from the first network management device, and the third operation and maintenance service belonging to the first operation and maintenance service, the network element management device determines, based on the first correspondence, that the third operation and maintenance service is provided by the first network management device and executes the third operation and maintenance service; and
- in response to the third operation and maintenance service information being from the second network management device, and the third operation and maintenance service belonging to the second operation and maintenance service, the network element management device determines, based on the second correspondence, that the third operation and maintenance service is provided by the second network management device and executes the third operation and maintenance service.

12. A communication device, comprising a processor, wherein the processor is coupled to at least one memory, and the processor is configured to execute a computer program stored in the at least one memory to cause the communication device to perform:
- receiving first operation and maintenance service information and second operation and maintenance service information, wherein
  - the first operation and maintenance service information describes a first operation and maintenance service provided by a first network management device, and
  - the second operation and maintenance service information describes a second operation and maintenance service provided by a second network management device;
- determining a first correspondence between the first operation and maintenance service and the first network management device, and a second correspondence between the second operation and maintenance service and the second network management device;
- receiving third operation and maintenance service information, wherein the third operation and maintenance service information describes a third operation and maintenance service;
- in response to the third operation and maintenance service information being from the first network management device, and the third operation and maintenance service belonging to the first operation and maintenance service, executing the third operation and maintenance service; and
- in response to the third operation and maintenance service information being from the second network management device, and the third operation and maintenance service belonging to the second operation and maintenance service, executing the third operation and maintenance service.

13. A network management method, performed at a first network management device, and comprising:
- determining first operation and maintenance service information, wherein the first operation and maintenance service information describes a first operation and maintenance service for which the first network management device is responsible;
- sending the first operation and maintenance service information for determining a first correspondence between the first operation and maintenance service and the first network management device;
- receiving a seventh correspondence of a second network management device from a network element management device, wherein the seventh correspondence is a correspondence, in the second network management device, between a second operation and maintenance service and the second network management device;
- determining a fourth verification result based on the seventh correspondence and a second correspondence, wherein the second correspondence is a correspondence between the second operation and maintenance service and the second network management device in the first network management device; and
- sending the fourth verification result to the network element management device, wherein
  - the fourth verification result comprises a verification success or a verification failure;
  - the verification success of the fourth verification result indicates that the seventh correspondence is consistent with the second correspondence; and the verification failure of the fourth verification result indicates that the seventh correspondence is inconsistent with the second correspondence.

14. The network management method according to claim 13, wherein the determining the first operation and maintenance service information comprises:
receiving the first operation and maintenance service information from the second network management device, or
generating, by the first network management device, the first operation and maintenance service information.

15. The network management method according to claim 13, further comprising:
obtaining time information, wherein the time information indicates at least one of effective time or expiration time of the first operation and maintenance service information.

16. The network management method according to claim 13, wherein the network management method further comprises:
obtaining identifier information, wherein the identifier information identifies at least one of:
the first network management device,
a user of an enterprise corresponding to the first network management device, or
an operator corresponding to the first network management device; and
determining a first association relationship between the identifier information and the first correspondence.

17. The network management method according to claim 13, wherein
the first network management device belongs to a network management system of an enterprise, and the second network management device belongs to a network management system of an operator; or
the first network management device belongs to a network management system of the operator, and the second network management device belongs to a network management system of the enterprise; or
the first network management device belongs to a network management system of a first enterprise, and the second network management device belongs to a network management system of a second enterprise.

18. The network management method according to claim 13, wherein
the first operation and maintenance service information is a type of the first operation and maintenance service, comprising at least one of: configuration management (CM), fault management (FM), or performance management (PM); or
the first operation and maintenance service information is an operation of the first operation and maintenance service.

19. The network management method according to claim 13, wherein the network management method further comprises:
sending the second correspondence.

20. The network management method according to claim 13, wherein the sending the first operation and maintenance service information comprises:
sending the first correspondence to the network element management device or the second network management device, wherein the first correspondence comprises the first operation and maintenance service information.

* * * * *